US007555139B2

(12) United States Patent
Rhoads et al.

(10) Patent No.: US 7,555,139 B2
(45) Date of Patent: *Jun. 30, 2009

(54) SECURE DOCUMENTS WITH HIDDEN SIGNALS, AND RELATED METHODS AND SYSTEMS

(75) Inventors: Geoffrey B. Rhoads, West Linn, OR (US); Tony F. Rodriguez, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/877,518

(22) Filed: Oct. 23, 2007

(65) Prior Publication Data

US 2008/0130945 A1 Jun. 5, 2008

Related U.S. Application Data

(63) Continuation of application No. 10/460,092, filed on Jun. 11, 2003, now Pat. No. 7,286,684, which is a continuation-in-part of application No. 09/939,298, filed on Aug. 24, 2001, now Pat. No. 6,804,379, which is a continuation of application No. 09/127,502, filed on Jul. 31, 1998, now Pat. No. 6,345,104, said application No. 10/460,092 is a continuation-in-part of application No. 09/553,112, filed on Apr. 20, 2000, now abandoned, and a continuation-in-part of application No. 10/165,751, filed on Jun. 6, 2002, now Pat. No. 6,754,377, which is a continuation of application No. 09/074,034, filed on May 6, 1998, now Pat. No. 6,449,377, which is a continuation-in-part of application No. 08/438,159, filed on May 8, 1995, now Pat. No. 5,850,481.

(60) Provisional application No. 60/131,005, filed on Apr. 22, 1999, provisional application No. 60/082,228, filed on Apr. 16, 1998.

(51) Int. Cl.
*H04K 1/00* (2006.01)

(52) U.S. Cl. .......................... 382/100; 382/135

(58) Field of Classification Search ................ 382/100, 382/135, 137, 232; 380/54, 55; 283/72, 283/85, 93, 113, 901, 902; 340/5.86; 713/176; 358/3.28

See application file for complete search history.

(56) References Cited

U.S. PATENT DOCUMENTS

| 3,831,007 | A | 8/1974 | Braun ................. 235/61.11 E |
| 4,590,366 | A | 5/1986 | Rothfjell ................... 235/494 |
| 4,675,746 | A | 6/1987 | Tetrick et al. .............. 358/296 |
| 4,677,466 | A | 6/1987 | Lert, Jr. et al. ................ 358/84 |
| 4,689,477 | A | 8/1987 | Goldman ................... 235/380 |
| 4,728,984 | A | 3/1988 | Daniele ......................... 355/6 |
| 4,736,109 | A | 4/1988 | Dvorzsak .................... 250/566 |
| 4,843,631 | A | 6/1989 | Steinpichler et al. .......... 382/43 |
| 4,874,936 | A | 10/1989 | Chandler et al. ............ 235/494 |
| 4,908,873 | A | 3/1990 | Philibert et al. ............... 382/34 |
| 4,972,476 | A | 11/1990 | Nathans ....................... 380/23 |
| 5,018,767 | A | 5/1991 | Wicker ......................... 283/67 |
| 5,091,966 | A | 2/1992 | Bloomberg et al. .......... 382/21 |
| 5,221,833 | A | 6/1993 | Hecht ......................... 235/494 |
| 5,237,164 | A | 8/1993 | Takada ........................ 235/487 |
| 5,284,364 | A | 2/1994 | Jain ............................. 283/87 |
| 5,291,243 | A | 3/1994 | Heckman et al. ............ 355/201 |
| 5,319,453 | A | 6/1994 | Copriviza et al. .............. 348/6 |
| 5,329,108 | A | 7/1994 | Lamoure .................... 235/494 |
| 5,337,361 | A | 8/1994 | Wang et al. .................... 380/51 |
| 5,374,976 | A | 12/1994 | Spannenburg ............... 355/201 |
| 5,379,345 | A | 1/1995 | Greenberg .................... 380/23 |
| 5,384,846 | A | 1/1995 | Berson et al. ................. 380/23 |
| 5,436,970 | A | 7/1995 | Ray et al. ...................... 380/23 |
| 5,449,896 | A | 9/1995 | Hecht et al. ................. 235/494 |
| 5,469,222 | A | 11/1995 | Sprague ..................... 348/580 |
| 5,471,533 | A | 11/1995 | Wang et al. .................... 380/51 |
| 5,495,581 | A | 2/1996 | Tsai ........................... 395/154 |
| 5,505,494 | A | 4/1996 | Belluci et al. ................. 283/75 |
| 5,515,451 | A | 5/1996 | Tsuji et al. .................. 382/135 |
| 5,629,770 | A | 5/1997 | Brassil et al. ............. 358/261.1 |
| 5,636,292 | A | 6/1997 | Rhoads ....................... 382/232 |
| 5,646,997 | A | 7/1997 | Barton ........................ 380/23 |
| 5,652,626 | A | 7/1997 | Kawakami et al. .......... 348/463 |

(Continued)

FOREIGN PATENT DOCUMENTS

DE        29 43 436 A1    5/1981

(Continued)

OTHER PUBLICATIONS

Sheng et al., "Experiments on pattern recognition using invariant Fourier-Mellin descriptors," J. Opt. Soc. Am. A, vol. 3, No. 6, Jun. 1986, pp. 771-776.

(Continued)

*Primary Examiner*—Andrew W Johns

(57) ABSTRACT

A security document comprising artwork including a security pattern, characterized in that the security pattern has the form of a line structure in which lines width or line spacing is adjusted to carry predefined data. The artwork is generated by the modifying at least one color of at least a part of the artwork to embed the security pattern in the artwork. Methods for detecting the security pattern include use of a frequency domain structure to detect the security pattern despite rotation and scaling of the document, use of signal tiling to improve signal detection, and use of statistical analyses to verify detection of the security pattern.

25 Claims, 13 Drawing Sheets

U.S. PATENT DOCUMENTS

| | | | |
|---|---|---|---|
| 5,659,726 A | 8/1997 | Sandford, II et al. | 395/612 |
| 5,671,277 A | 9/1997 | Ikenoue et al. | 380/7 |
| 5,671,282 A | 9/1997 | Wolff et al. | 380/25 |
| 5,694,471 A | 12/1997 | Chen et al. | 380/25 |
| 5,721,788 A | 2/1998 | Powell et al. | 382/100 |
| 5,748,783 A | 5/1998 | Rhoads | 382/232 |
| 5,768,426 A | 6/1998 | Rhoads | 382/232 |
| 5,787,186 A | 7/1998 | Schroeder | 382/115 |
| 5,799,092 A | 8/1998 | Kristol et al. | 380/51 |
| 5,835,639 A | 11/1998 | Honsinger et al. | 382/278 |
| 5,841,886 A | 11/1998 | Rhoads | 382/115 |
| 5,845,008 A | 12/1998 | Katoh et al. | 382/217 |
| 5,864,622 A | 1/1999 | Marcus | 380/23 |
| 5,907,149 A | 5/1999 | Marckini | 235/487 |
| 5,912,974 A | 6/1999 | Holloway et al. | 380/51 |
| 5,949,055 A | 9/1999 | Fleet et al. | 235/469 |
| 5,951,055 A | 9/1999 | Mowry, Jr. | 283/93 |
| 5,982,956 A | 11/1999 | Lahmi | 382/306 |
| 6,024,287 A | 2/2000 | Takai et al. | 235/493 |
| 6,044,171 A | 3/2000 | Polyakov et al. | 382/159 |
| 6,076,738 A | 6/2000 | Bloomberg et al. | 235/494 |
| 6,081,345 A * | 6/2000 | Curry | 358/1.9 |
| 6,263,087 B1 | 7/2001 | Miller | 382/100 |
| 6,289,108 B1 | 9/2001 | Rhoads | 382/100 |
| 6,292,092 B1 | 9/2001 | Chow et al. | 340/5.6 |
| 6,343,138 B1 | 1/2002 | Rhoads | 382/100 |
| 6,345,104 B1 | 2/2002 | Rhoads | 382/100 |
| 6,408,082 B1 | 6/2002 | Rhoads et al. | 382/100 |
| 6,424,725 B1 | 7/2002 | Rhoads et al. | 382/100 |
| 6,427,020 B1 | 7/2002 | Rhoads | 382/100 |
| 6,449,377 B1 | 9/2002 | Rhoads | 382/100 |
| 6,487,301 B1 | 11/2002 | Zhao | 382/100 |
| 6,516,079 B1 | 2/2003 | Rhoads et al. | 382/100 |
| 6,522,771 B2 | 2/2003 | Rhoads | 382/100 |
| 6,546,112 B1 | 4/2003 | Rhoads | 382/100 |
| 6,549,638 B2 | 4/2003 | Davis et al. | 382/100 |
| 6,567,534 B1 | 5/2003 | Rhoads | 382/100 |
| 6,580,808 B2 | 6/2003 | Rhoads | 382/100 |
| 6,580,819 B1 | 6/2003 | Rhoads | 382/135 |
| 6,674,886 B2 | 1/2004 | Davis et al. | 382/135 |
| 6,700,990 B1 | 3/2004 | Rhoads | 382/100 |
| 6,727,996 B1 | 4/2004 | Silverbrook et al. | 358/1.1 |
| 6,751,336 B2 | 6/2004 | Zhao | 382/100 |
| 6,754,377 B2 | 6/2004 | Rhoads | 382/135 |
| 6,782,116 B1 | 8/2004 | Zhao et al. | 382/100 |
| 6,813,366 B1 | 11/2004 | Rhoads | 382/100 |
| 6,830,196 B1 | 12/2004 | Silverbrook et al. | 235/494 |
| 6,871,789 B2 | 3/2005 | Hilton et al. | 235/494 |
| 6,922,480 B2 | 7/2005 | Rhoads | 382/137 |
| 6,959,100 B2 | 10/2005 | Rhoads | 382/100 |
| 7,043,052 B2 | 5/2006 | Rhoads | 382/100 |
| 7,072,490 B2 | 7/2006 | Stach | 382/100 |
| 7,080,041 B2 | 7/2006 | Nagel | 705/51 |
| 7,099,019 B2 | 8/2006 | Silverbrook et al. | 358/1.1 |
| 7,113,615 B2 | 9/2006 | Rhoads et al. | 382/100 |
| 7,181,042 B2 | 2/2007 | Tian | 382/100 |
| 7,239,734 B2 | 7/2007 | Alattar et al. | 382/135 |
| 7,286,684 B2 | 10/2007 | Rhoads | 382/100 |
| 7,330,563 B2 | 2/2008 | Rhoads | 382/100 |
| 7,349,555 B2 | 3/2008 | Rhoads | 382/100 |
| 2007/0098213 A1 | 5/2007 | Rhoads | 382/100 |
| 2008/0118099 A1 | 5/2008 | Alattar et al. | 382/100 |

FOREIGN PATENT DOCUMENTS

| | | |
|---|---|---|
| EP | 0 493 091 A1 | 7/1992 |
| EP | 0 629972 A2 | 12/1994 |
| EP | 0 642060 B1 | 4/1999 |
| EP | 0736860 B1 | 10/2002 |
| JP | 3-185585 A | 8/1991 |
| WO | 9603286 A1 | 2/1996 |
| WO | 2006/048368 A1 | 5/2006 |

OTHER PUBLICATIONS

Bender et al., "Techniques for Data Hiding," SPIE vol. 2420, Jan. 1995, pp. 164-173.

Burgett, et al., "A Novel Method for Copyright Labeling Digitized Image Data," Sep. 7, 1994.

Kawaguchi et al., "Principle and Applications of BPCS-Steganography," Proc. SPIE vol. 3528: Multimedia Systems and Applications, Nov. 2-4, 1998, pp. 464-473.

Komatsu et al., "A Proposal on Digital Watermarking in Document Image Communication and Its Application to Realizing a Signature," Electronics and Communications in Japan, Part I, vol. 73, No. 5, 1990, pp. 22-23.

Komatsu et al., "Authentication System Using Concealed Image in Telematics," Memoirs of the School of Science & Engineering, Waseda Univ., No. 52, 1988, pp. 45-60.

Koch et al., "Copyright Protection for Multimedia Data," Proc. Of the Int. Conf. On Digital Media and Electronic Publishing, Leeds, U.K., Dec. 16, 1994, 15 pages.

Zhao, et al., "Embedding Robust Labels into Images for Copyright Protection," Proc. Of the Intern. Congress on Intel. Prop. Rights for Specialized Information, Knowledge and New Technologies (Vienna, Austria, Aug. 21-25, 1995).

Guido, "Preventing Copying of Classified Information," IBM Technical Disclosure Bulletin, Sep. 1976, pp. 1469-1470.

Szepanski, W., "A Signal Theoretic Method for Creating Forgery-Proof Document for Automatic Verification," Proceedings 1979 Carnahan Conference on Crime Countermeasures, May 16, 1979, pp. 101-109.

Oct. 22, 2008 Amendment; and Oct. 8, 2008 Office Action (Restriction Requirement); all from assignee's U.S. Appl. No. 11/825,258 (published as US 2008-01228099 A1).

Bruckstein, A.M.; Richardson, T.J., A holographic transform domain image watermarking method, Circuits, Systems, and Signal Processing vol. 17, No. 3, p. 361-89, 1998. This paper includes an appendix containing an internal memo of Bell Labs, which according to the authors of the paper, was dated Sep. 1994.

Chen, et al, "Symmetric Phase-Only Matched Filtering of Fourier-Mellin Transforms for Image Registration and Recognition," IEEE Trans. On Pattern Analysis and Machine Intelligence, vol. 16, No. 12, Dec. 1994, pp. 1156-1168.

Tanaka et al., "Embedding Secret Information into a Dithered Multi-level Image," IEEE, pp. 216-220, 1990.

Tanaka et al., "A Visual Retrieval System with Private Information for Image Database," Proc. Int'l Conf. on DSP Appl. & Tech., pp. 415-421, Oct. 1991.

Wagner, "Fingerprinting," IEEE, Symp. on Security and Privacy, 1983, pp. 18-22.

Xydeas et al., "Embedding Data Into Pictures by Modulo Masking," IEEE Transactions on Communications, 1984, vol. COM-32, No. 1, pp. 56-69.

* cited by examiner

| 204 | 211 | 212 | 214 | 213 | 207 | 215 | 214 |
| --- | --- | --- | --- | --- | --- | --- | --- |
| 204 | 215 | 202 | 205 | 209 | 205 | 213 | 202 |
| 212 | 207 | 203 | 214 | 203 | 206 | 202 | 215 |
| 209 | 201 | 211 | 201 | 212 | 204 | 200 | 203 |
| 208 | 204 | 212 | 206 | 207 | 203 | 205 | 202 |
| 209 | 214 | 207 | 207 | 211 | 201 | 206 | 213 |
| 208 | 212 | 206 | 211 | 213 | 208 | 206 | 213 |
| 209 | 208 | 202 | 202 | 205 | 205 | 205 | 211 |

REFERENCE GREY-SCALE CALIBRATION TILE

SECURE DOCUMENTS WITH HIDDEN SIGNALS, AND RELATED METHODS AND SYSTEMS

RELATED APPLICATION DATA

This application is a continuation of application Ser. No. 10/460,092, filed Jun. 11, 2003 (now U.S. Pat. No. 7,286,684), which is a continuation in part of application Ser. No. 09/939,298, filed Aug. 24, 2001 (now U.S. Pat. No. 6,804,379), which is a continuation of application Ser. No. 09/127,502, filed Jul. 31, 1998 (now U.S. Pat. No. 6,345,104), which claims the benefit of provisional application 60/082,228, filed Apr. 16, 1998 (the specification of which is attached as Appendix A).

Application Ser. No. 10/460,092 is also a continuation in part of Ser. No. 09/553,112, filed Apr. 20, 2000, (now abandoned), which claims priority to provisional application 60/131,005, filed Apr. 22, 1999, which are hereby incorporated by reference.

Application Ser. No. 10/460,092 is also a continuation in part of Ser. No. 10/165,751, filed Jun. 6, 2002 (now U.S. Pat. No. 6,754,377), which is a continuation of Ser. No. 09/074,034, filed May 6, 1998 (now U.S. Pat. No. 6,449,377), which is a continuation-in-part of application Ser. No. 08/438,159 (now U.S. Pat. No. 5,850,481), filed May 8, 1995, and also claims priority to provisional application 60/082,228, filed Apr. 16, 1998.

The subject matter of this application is also related to that of the present assignee's other issued patents (U.S. Pat. Nos. 5,636,292, 5,710,834, 5,721,788, 5,748,763, 5,748,783, 5,768,426, 5,850,481, 5,841,978, 5,832,119, 5,822,436, 5,841,886, 5,809,160, 6,122,403 and 6,026,193).

FIELD OF THE INVENTION

The invention relates to methods and systems for carrying auxiliary data in graphical structures on printed documents.

BACKGROUND AND SUMMARY OF THE INVENTION

Digital watermarking (sometimes termed "data hiding" or "data embedding") is a growing field of endeavor, with several different approaches. The present assignee's work is reflected in the patents and applications detailed above, together with laid-open PCT application WO97/43736. Other work is illustrated by U.S. Pat. Nos. 5,734,752, 5,646,997, 5,659,726, 5,664,018, 5,671,277, 5,687,191, 5,687,236, 5,689,587, 5,568,570, 5,572,247, 5,574,962, 5,579,124, 5,581,500, 5,613,004, 5,629,770, 5,461,426, 5,743,631, 5,488,664, 5,530,759, 5,539,735, 4,943,973, 5,337,361, 5,404,160, 5,404,377, 5,315,098, 5,319,735, 5,337,362, 4,972,471, 5,161,210, 5,243,423, 5,091,966, 5,113,437, 4,939,515, 5,374,976, 4,855,827, 4,876,617, 4,939,515, 4,963,998, 4,969,041, and published foreign applications WO 98/02864, EP 822,550, WO 97/39410, WO 96/36163, GB 2,196,167, EP 777,197, EP 736,860, EP 705,025, EP 766,468, EP 782,322, WO 95/20291, WO 96/26494, WO 96/36935, WO 96/42151, WO 97/22206, WO 97/26733. Some of the foregoing patents relate to visible watermarking techniques. Other visible watermarking techniques (e.g. data glyphs) are described in U.S. Pat. Nos. 5,706,364, 5,689,620, 5,684,885, 5,680,223, 5,668,636, 5,640,647, 5,594,809.

Much of the work in data embedding is not in the patent literature but rather is published in technical articles. In addition to the patentees of the foregoing patents, some of the other workers in this field (whose watermark-related writings can by found by an author search in the INSPEC or NEXIS databases, among others) include I. Pitas, Eckhard Koch, Jian Zhao, Norishige Morimoto, Laurence Boney, Kineo Matsui, A. Z. Tirkel, Fred Mintzer, B. Macq, Ahmed H. Tewfik, Frederic Jordan, Naohisa Komatsu, Joseph O'Ruanaidh, Neil Johnson, Ingemar Cox, Minerva Yeung, and Lawrence O'Gorman.

The artisan is assumed to be familiar with the foregoing prior art.

In the following disclosure it should be understood that references to watermarking encompass not only the assignee's watermarking technology, but can likewise be practiced with any other watermarking technology, such as those indicated above.

Digital watermarking can be applied to myriad forms of information. This disclosure focuses on its applications to security documents. However, it should be recognized that the principles discussed below can also be applied outside this area.

Most of the prior art in image watermarking has focused on pixelated imagery (e.g., bit-mapped images, JPEG/MPEG imagery, VGA/SVGA display devices, etc.). In most watermarking techniques, the luminance or color values of component pixels are slightly changed to effect subliminal encoding of binary data through the image. (This encoding can be done directly in the pixel domain, or after the signal has been processed and represented differently—e.g., as DCT or wavelet coefficients, or as compressed data, etc.)

While pixelated imagery is a relatively recent development, security documents—commonly employing line art—go back centuries. One familiar example is U.S. paper currency. On the one dollar banknote, for example, line art is used in several different ways. One is to form intricate webbing patterns (sometimes termed "guilloche patterns") around the margin of the note (generally comprised of light lines on dark background). Another is to form gray scale imagery, such as the portrait of George Washington (generally comprised of dark lines on a light background).

There are two basic ways to simulate grey-scales in security document line art. One is to change the relative spacings of the lines to effect a lightening or darkening of an image region. FIG. 1A shows such an arrangement; area B looks darker than area A due to the closer spacings of the component lines. The other technique is to change the widths of the component lines—wider lines resulting in darker areas and narrower lines resulting in lighter areas. FIG. 1B shows such an arrangement. Again, area B looks darker than area A, this time due to the greater widths of the component lines. These techniques are often used together. Ultimately, a given region simply has more or less ink.

In my application Ser. No. 08/438,159 I introduced, and in my application Ser. No. 09/074,034 I elaborated on, techniques for watermarking line art by making slight changes to the widths, or positions, of the component lines. Such techniques are further expanded in the present disclosure.

In several of my cited applications, I discussed various "calibration signals" that can be used to facilitate the decoding of watermark data despite corruption of the encoded image, such as by scaling or rotation. Common counterfeiting techniques—e.g., color photocopying, or scanning/inkjet printing—often introduce such corruption, whether deliberately or accidentally. Accordingly, it is important that watermarks embedded in security documents be detectable notwithstanding such effects. Calibration signals particularly suited for use with security documents are detailed in this disclosure.

In some embodiments, security documents are encoded to convey machine-readable multi-bit binary information (e.g., digital watermarks), usually in a manner not alerting human viewers that such information is present. The documents can be provided with overt or subliminal calibration patterns. When a document incorporating such a pattern is scanned (e.g., by a photocopier), the pattern facilitates detection of the encoded information notwithstanding possible scaling or rotation of the scan data. The calibration pattern can serve as a carrier for the watermark information, or the watermark can be encoded independently. In one embodiment, the watermark and the calibration pattern are formed on the document by an intaglio process, with or without ink. A photocopier responsive to such markings can take predetermined action if reproduction of a security document is attempted. A passport processing station responsive to such markings can use the decoded binary data to access a database having information concerning the passport holder. Some such apparatuses detect both the watermark data and the presence of a visible structure characteristic of a security document (e.g., the seal of the issuing central bank).

One embodiment provides a method of generating a machine readable code for a printed document. The method generates a variable auxiliary message comprising message values and maps the message values to a two dimensional pattern of areas on the document. The areas each comprise an arrangement of pixels on the printed document. Depending on a value of the message mapped to a corresponding area, the method assigns a visible structure to the corresponding area. Different visible structures are assignable to a single value of the message to create a visible design having a desired aesthetic appearance.

One aspect of the invention is a printed security document. The security document comprising artwork including a security pattern, characterized in that the security pattern has the form of a line structure in which lines width or line spacing is adjusted to carry predefined data. The artwork is generated by the modifying at least one color of at least a part of the artwork to embed the security pattern in the artwork.

Another aspect of the invention is a method of generating artwork for a security document. This method provides a security pattern modulated to carry predefined data; and modifies width or line spacing of the artwork of the security document according to the security pattern. The artwork is generated by the modifying at least one color of at least a part of the artwork to embed the security pattern in the artwork.

Another aspect of the invention is a method of detecting a security pattern embedded in a security document. This method performs a frequency domain transform of artwork in the security document. The line width or spacing of line structures of the artwork is generated during document creation to incorporate the security pattern. The method detects the security pattern by correlating the transformed artwork with a predefined signal. The security pattern has frequency domain attributes that enable detection of the security pattern despite rotation of the security document.

Another aspect of the invention is a method of detecting a security pattern embedded in a security document. This method comprises analyzing artwork to detect the security pattern in modifications of the line width or spacing of line structures of the artwork; and performing plural statistical analyses on the detected security pattern to read predefined data carried in the security pattern.

The foregoing and other features and advantages of the present technology will be more readily apparent from the following detailed description, which proceeds with reference to the accompanying drawings.

DETAILED DESCRIPTION

By way of introduction, this specification begins with review of techniques for embedding watermark data in line art, as disclosed in my application Ser. No. 09/074,034.

Figure 1A:
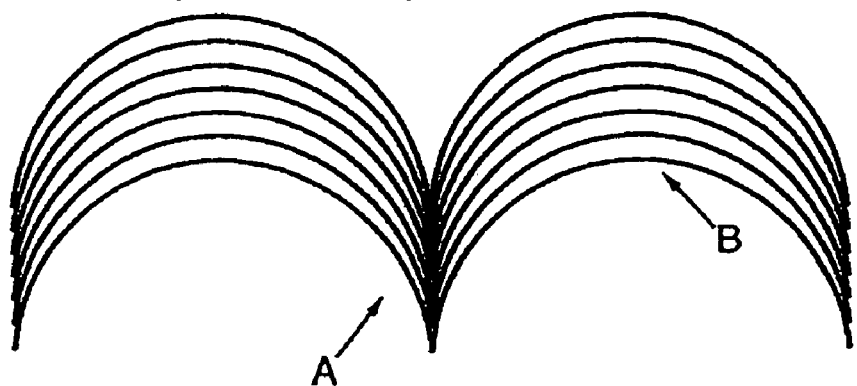
FIGS. 1A and 1B show prior art techniques for achieving grey-scale effects using line art.
Figure 1B:
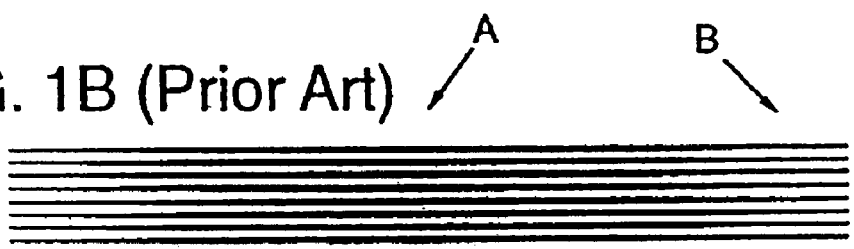
Figure 2:
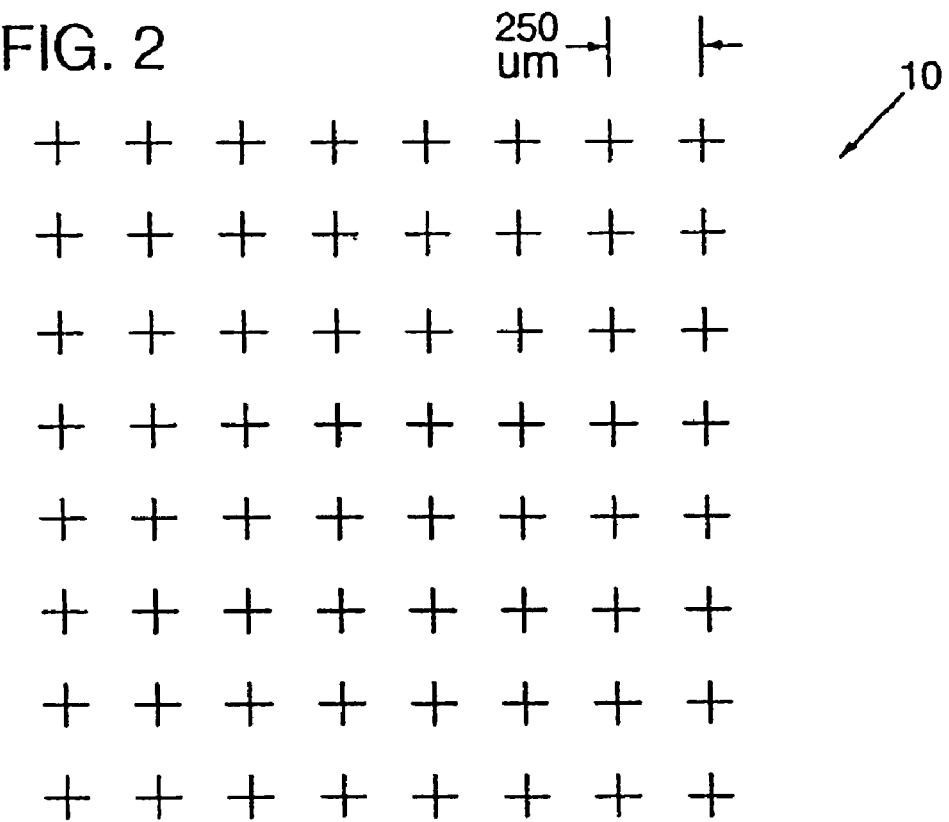
FIG. 2 shows a virtual array of grid points that can be imposed on a security document image according to an embodiment.

Referring to FIG. 2, the earlier-described technique employs a grid 10 of imaginary reference points arrayed over a line art image. The spacing between points is 250 microns in the illustrated arrangement, but greater or lesser spacings can of course be used.

Figure 3:
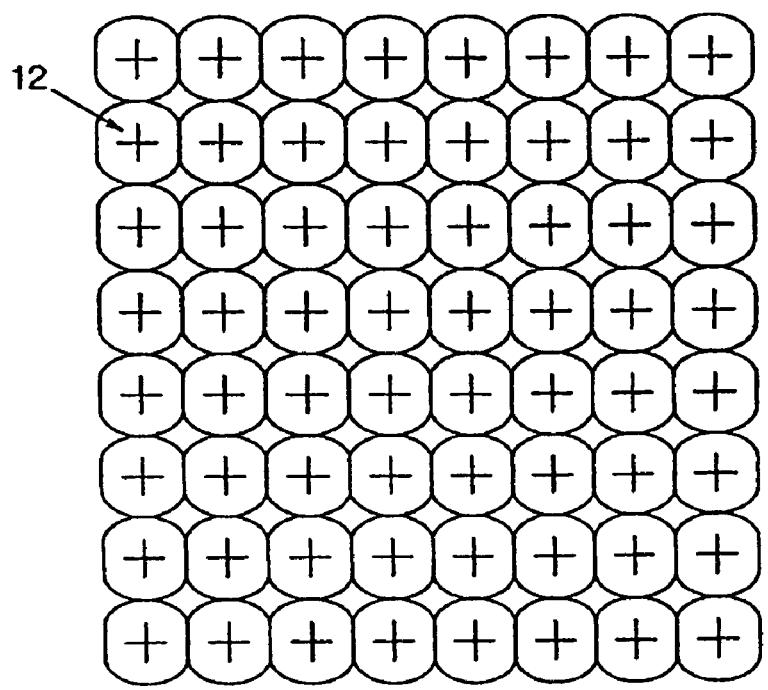
FIG. 3 shows a virtual array of regions that can be imposed on a security document image according to the FIG. 2 embodiment.

Associated with each grid point is a surrounding region 12, shown in FIG. 3. As described below, the luminosity (or reflectance) of each of these regions 12 is slightly changed to effect subliminal encoding of binary data.

Region 12 can take various shapes; the illustrated rounded-rectangular shape is representative only. (The illustrated shape has the advantage of encompassing a fairly large area while introducing fewer visual artifacts than, e.g., square regions.) In other embodiments, squares, rectangles, circles, ellipses, etc., can alternatively be employed.

Figure 4:
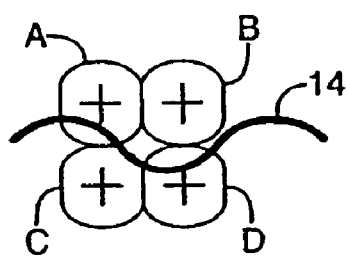
FIG. 4 shows an excerpt of FIG. 3 with a line from a line art image passing therethrough.

FIG. 4 is a magnified view of an excerpt of FIG. 3, showing a line 14 passing through the grid of points. The width of the line, of course, depends on the particular image of which it is a part. The illustrated line is about 40 microns in width; greater or lesser widths can naturally be used.

Figure 5:
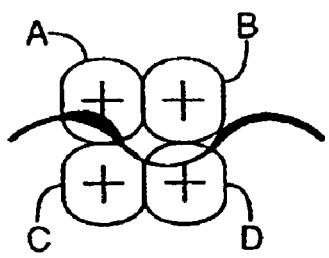
FIG. 5 shows changes to the width of the line of FIG. 3 to effect watermark encoding.

In one encoding technique, shown in FIG. 5, the width of the line is controllably varied so as to change the luminosity of the regions through which it passes. To increase the luminosity (or reflectance), the line is made narrower (i.e. less ink in the region). To decrease the luminosity, the line is made wider (i.e. more ink).

Whether the luminance in a given region should be increased or decreased depends on the particular watermarking algorithm used. Any algorithm can be used, by changing the luminosity of regions 12 as the algorithm would otherwise change the luminance or colors of pixels in a pixelated image. (Some watermarking algorithms effect their changes in a transformed domain, such as DCT, wavelet, or Fourier. However, such changes are ultimately manifested as changes in luminance or color.)

In an exemplary algorithm, the binary data is represented as a sequence of −1s and 1s, instead of 0s and 1s. (The binary data can comprise a single datum, but more typically comprises several. In an illustrative embodiment, the data comprises 128 bits, some of which are error-correcting or -detecting bits.)

Each element of the binary data sequence is then multiplied by a corresponding element of a pseudo-random number sequence, comprised of −1s and 1s, to yield an intermediate data signal. Each element of this intermediate data signal is mapped to a corresponding sub-part of the image, such as a region 12. (Commonly, each element is mapped to several such sub-parts.) The image in (and optionally around) this region is analyzed to determine its relative capability to conceal embedded data, and a corresponding scale factor is produced. Exemplary scale factors may range from 0 to 3. The scale factor for the region is then multiplied by the element of the intermediate data signal mapped to the region in order to yield a "tweak" or "bias" value for the region. In the illustrated case, the resulting tweaks can range from −3 to 3. The luminosity of the region is then adjusted in accordance with the tweak value. A tweak value of −3 may correspond to a −5% change in luminosity; −2 may correspond to −2% change; −1 may correspond to −1% change; 0 may correspond to no change; 1 may correspond to +1% change; 2 may correspond to +2% change, and 3 may correspond to +5% change. (This example follows the basic techniques described in the Real Time Encoder embodiment disclosed in U.S. Pat. No. 5,710,834.)

In FIG. 5, the watermarking algorithm determined that the luminance of region A should be reduced by a certain percentage, while the luminance of regions C and D should be increased by certain percentages.

In region A, the luminance is reduced by increasing the line width. In region D, the luminance is increased by reducing the line width; similarly in region C (but to a lesser extent).

No line passes through region B, so there is no opportunity to change the region's luminance. This is not fatal to the method, however, since the exemplary watermarking algorithm redundantly encodes each bit of data in sub-parts spaced throughout the line art image.

The changes to line widths in regions A and D of FIG. 5 are exaggerated for purposes of illustration. While the illustrated variance is possible, most implementations will typically modulate the line width 3-50% (increase or decrease).

(Many watermarking algorithms routinely operate within a signal margin of about +/−1% changes in luminosity to effect encoding. That is, the "noise" added by the encoding amounts to just 1% or so of the underlying signal. Lines typically don't occupy the full area of a region, so a 10% change to line width may only effect a 1% change to region luminosity, etc. Security documents are different from photographs in that the artwork generally need not convey photorealism. Thus, security documents can be encoded with higher energy than is used in watermarking photographs, provided the result is still aesthetically satisfactory. To illustrate, localized luminance changes on the order of 10% are possible in security documents, while such a level of watermark energy in photographs would generally be considered unacceptable. In some contexts, localized luminance changes of 20, 30, 50 or even 100% are acceptable.)

In the illustrated technique, the change to line width is a function solely of the watermark tweak (or watermark/calibration pattern tweak, as discussed below) to be applied to a single region. Thus, if a line passes through any part of a region to which a tweak of 2% is to be applied, the line width in that region is changed to effect the 2% luminance difference. In variant techniques, the change in line width is a function of the line's position in the region. In particular, the change in line width is a function of the distance between the region's center grid point and the line's closest approach to that point. If the line passes through the grid point, the full 2% change is effected. At successively greater distances, successively smaller changes are applied. The manner in which the magnitude of the tweak changes as a function of line position within the region can be determined by applying one of various interpolation algorithms, such as the bi-linear, bi-cubic, cubic splines, custom curve, etc.

In other variant techniques, the change in line width in a given region is a weighted function of the tweaks for adjoining or surrounding regions. Thus, the line width in one region may be increased or decreased in accordance with a tweak value corresponding to one or more adjoining regions.

Combinations of the foregoing techniques can also be employed.

In the foregoing techniques, it is sometimes necessary to trade-off the tweak values of adjoining regions. For example, a line may pass along a border between regions, or pass through the point equidistant from four grid points ("equidistant zones"). In such cases, the line may be subject to conflicting tweak values—one region may want to increase the line width, while another may want to decrease the line width. (Or both may want to increase the line width, but differing amounts.) Similarly in cases where the line does not pass through an equidistant zone, but the change in line width is a function of a neighborhood of regions whose tweaks are of different values. Again, known interpolation functions can be employed to determine the weight to be given the tweak from each region in determining what change is to be made to the line width in any given region.

In the exemplary watermarking algorithm, the average change in luminosity across the security document image is zero, so no generalized lightening or darkening of the image is apparent. The localized changes in luminosity are so minute in magnitude, and localized in position, that they are essentially invisible (e.g. inconspicuous/subliminal) to human viewers.

Figure 6:
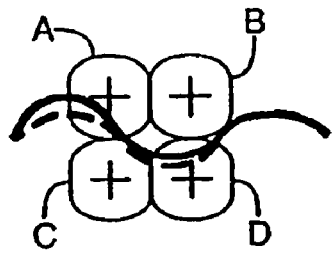
FIG. 6 shows changes to the position of the line of FIG. 3 to effect watermark encoding.

An alternative technique is shown in FIG. 6, in which line position is changed rather than line width.

In FIG. 6 the original position of the line is shown in dashed form, and the changed position of the line is shown in solid form. To decrease a region's luminosity, the line is moved slightly closer to the center of the grid point; to increase a region's luminosity, the line is moved slightly away. Thus, in region A, the line is moved towards the center grid point, while in region D it is moved away.

It will be noted that the line on the left edge of region A does not return to its nominal (dashed) position as it exits the region. This is because the region to the left of region A also is to have decreased luminosity. Where possible, it is generally preferable not to return a line to its nominal position, but instead to permit shifted lines to remain shifted as they enter adjoining regions. So doing permits a greater net line movement within a region, increasing the embedded signal level.

Again, the line shifts in FIG. 6 are somewhat exaggerated. More typical line shifts are on the order of 3-50 microns.

One way to think of the FIG. 6 technique is to employ a magnetism analogy. The grid point in the center of each region can be thought of as a magnet. It either attracts or repels lines. A tweak value of −3, for example, may correspond to a strong-valued attraction force; a tweak value of +2 may correspond to a middle-valued repulsion force, etc. In FIG. 6, the grid point in region A exhibits an attraction force (i.e. a negative tweak value), and the grid point in region D exhibits a repulsion force (e.g. a positive tweak value).

The magnetic analogy is useful because the magnetic effect exerted on a line depends on the distance between the line and the grid point. Thus, a line passing near a grid point is shifted more in position than a line near the periphery of the region.

(Actually, the magnetism analogy can serve as more than a conceptual tool. Instead, magnetic effects can be modeled in a computer program and serve to synthesize a desired placement of the lines relative to the grid points. Arbitrarily customized magnetic fields can be used.)

Each of the variants applicable to FIG. 5 is likewise applicable to FIG. 6.

Combinations of the embodiments of FIGS. 5 and 6 can of course be used, resulting in increased watermark energy, better signal-to-noise ratio and, in many cases, less noticeable changes.

In still a further technique, the luminance in each region is changed while leaving the line unchanged. This can be effected by sprinkling tiny dots of ink in the otherwise-vacant parts of the region. In high quality printing, of the type used with security documents, droplets on the order of 3 microns in diameter can be deposited. (Still larger droplets are still beyond the perception threshold for most viewers.) Speckling a region with such droplets (either in a regular array, or random, or according to a desired profile such as Gaussian), can readily effect a 1% or so change in luminosity. (Usually dark droplets are added to a region, effecting a decrease in luminosity. Increases in luminosity can be effected by speckling with a light colored ink, or by forming light voids in line art otherwise present in a region.) (Actually, production realities often mean that many such microdots will not print, but statistically some will.)

In a variant of the speckling technique, very thin mesh lines can be inserted in the artwork—again to slightly change the luminance of one or more regions (so-called "background tinting").

The following portion of the specification reviews a calibration, or synchronization pattern used in an illustrative security document to facilitate proper registration of the watermark data for decoding. It may be helpful to begin by reviewing further details about the illustrative watermarking method.

Figure 7A:
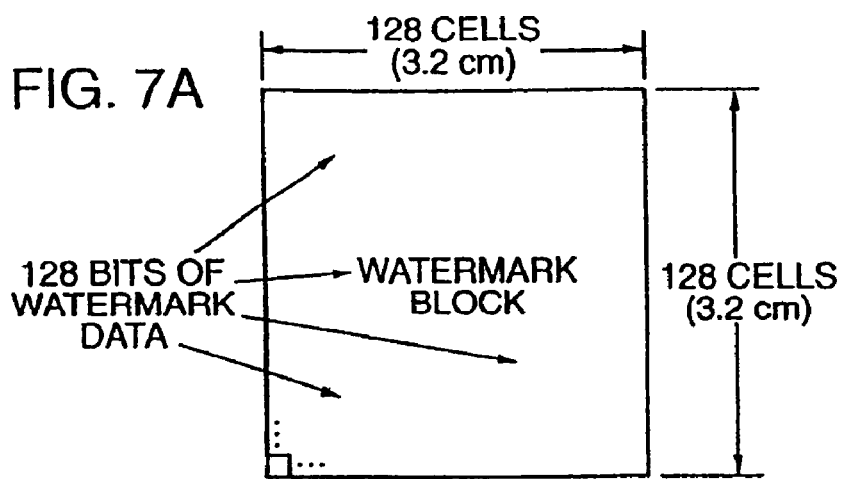
FIGS. 7A and 7B show aspects of watermark and calibration blocks.

Referring to FIG. 7A, an exemplary watermark is divided into "cells" that are 250 microns on a side, each conveying a single bit of information. The cells are grouped into a "block" having 128 cells on a side (i.e. 16,384 cells per block). The blocks are tiled across the region being watermarked (e.g. across the face of a security document).

As noted, the watermark payload consists of 128 bits of data. Each bit is represented by 128 different cells within each block. (The mapping of bits to cells can be pseudo-random, sequential, or otherwise.) The 128 "0"s and "1"s of the watermark data are randomized into substantially equal-probability "1"s and "−1"s by a pseudo-random function to reduce watermark visibility. Where a cell has a value of "1," the luminance of the corresponding area of the image is slightly increased; where a cell has a value of "−1," the luminance of the corresponding area of the image is slightly decreased (or vice versa). In some embodiments, the localized changes to image luminance due to the +1/−1 watermark cell values are scaled in accordance with data-hiding attributes of the local area (e.g. to a range of +/−4 digital numbers) to increase the robustness of the watermark without compromising its imperceptibility.

It should be noted that a single watermark "cell" commonly encompasses a large number of ink droplets. In high resolution printing, as is commonly used in security documents (e.g. 5000 microdroplets per inch), a single watermark cell may encompass a region of 50 droplets by 50 droplets. In other embodiments, a cell may encompass greater or lesser numbers of droplets.

Decoding a watermark requires precise re-registration of the scanned document image, so the watermark cells are located where expected. To facilitate such registration, a calibration signal can be employed.

An exemplary calibration signal is a geometrical pattern having a known Fourier-Mellin transform. As described in application Ser. No. 08/649,419, when a known pattern is transformed into the Fourier domain, and then further transformed into the Fourier-Mellin domain, the transformed data indicates the scale and rotation of the pattern. If this pattern is replicated on a security document that is thereafter scanned (as noted, scanning commonly introduces rotation, and sometimes scaling), the F-M transform data indicates the scale and rotation of the scanned data, facilitating virtual re-registration of the security document image for watermark detection.

Figure 7B:
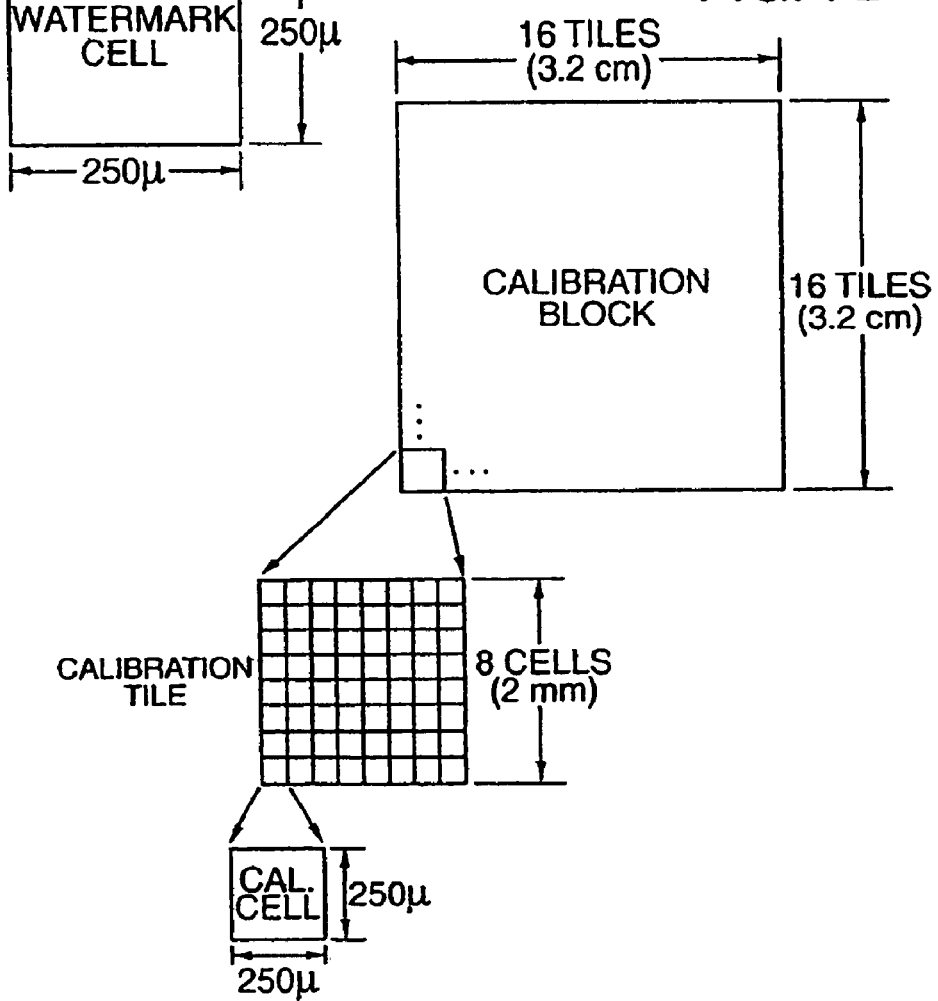

As shown in FIG. 7B, an illustrative geometrical calibration pattern is a block, 3.2 cm on a side. The block comprises a 16×16 array of substantially identical tiles, each 2 mm on a side. Each tile, in term, comprises an 8×8 array of component cells.

As described below, the geometrical calibration pattern in the illustrated embodiment is a visible design feature on the security document. Accordingly, unlike the watermark data, the calibration pattern does not have to be limited to a small range of digital numbers in order to keep it substantially hidden among other features of the document. Also unlike the watermark data, the illustrated calibration pattern is not locally scaled in accordance with data hiding attributes of the security document image.

It is possible to print rectangular grids of grey-scaled ink on a document to serve as a calibration pattern. However, aesthetic considerations usually discourage doing so. Preferable is to realize the calibration pattern in a more traditional art form, such as a seemingly random series of intertwining lines, forming a weave-like pattern that is printed across part or all of the document.

Figures 8, 12:
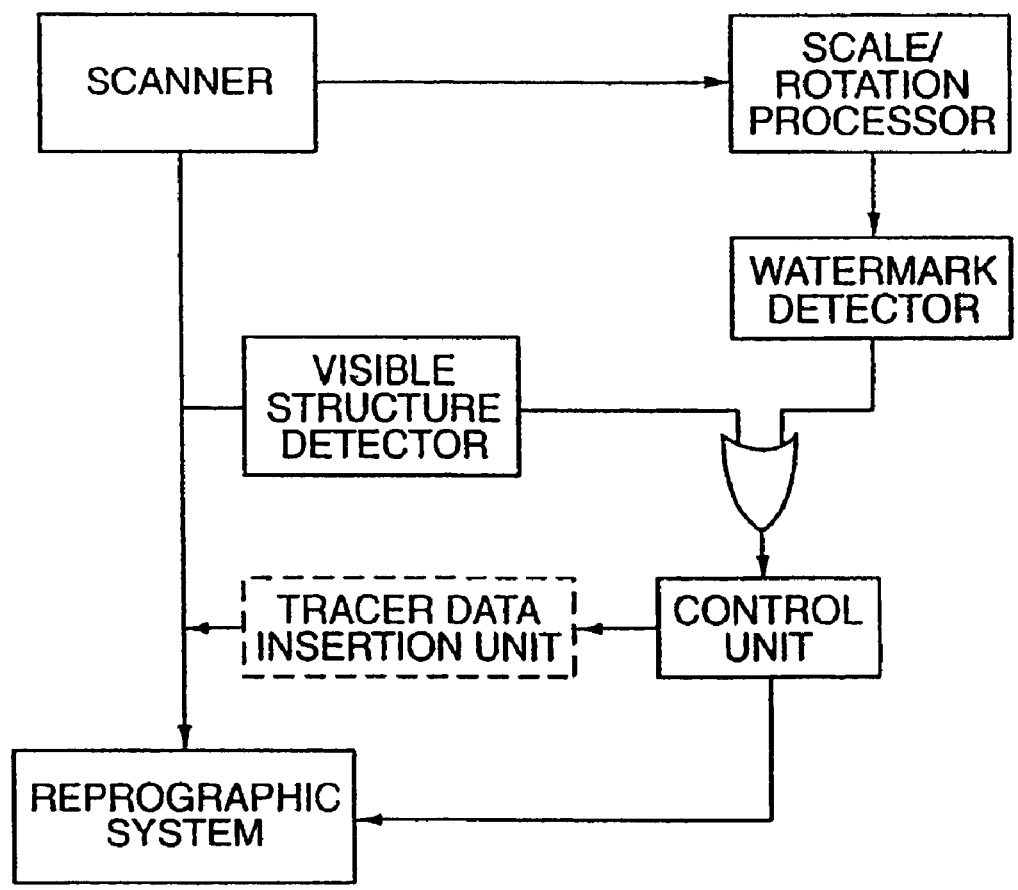
FIG. 8 shows an illustrative reference grey-scale calibration tile.
FIG. 12 is a block diagram of a photocopier.

To create this weave-like calibration pattern, a designer first defines an 8×8 cell reference calibration tile. Each cell in the tile is assigned a grey-scale value. In the illustrated embodiment, values within 2-10 percent of each other are used, although this is not essential. An exemplary reference calibration tile is shown in FIG. 8 (assuming 8-bit quantization).

The Fourier-Mellin transform of a block derived from this reference calibration tile will serve as the key by which the scale and rotation of a scanned security document image are determined.

There is some optimization that may be done in selecting/designing the pattern of grey-scale values that define the reference calibration tile. The pattern should have a F-M transform that is readily distinguished from those of other design and watermark elements on the security document. One design procedure effects a trial F-M transform of the rest of the security document design, and works backwards from this data to select a reference calibration tile that is readily distinguishable.

Once a reference tile pattern is selected, the next steps iteratively define a tile having a weave-like pattern whose local luminance values approximately match the reference tile's grey-scale pattern.

Figure 9A:
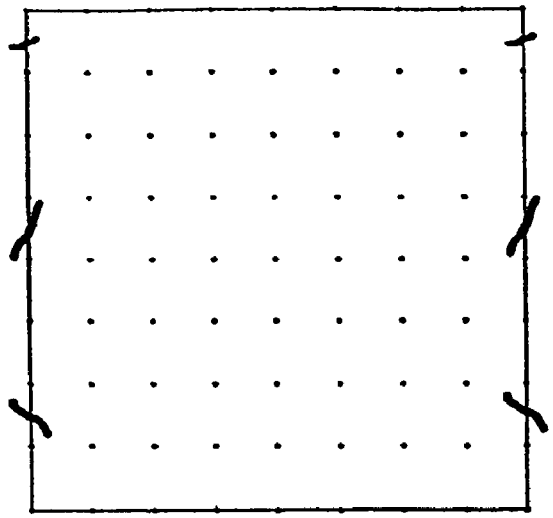
FIGS. 9A-9C show steps in the design of a weave calibration pattern.

Referring to FIG. 9A, the first such step is to select points on the bottom and left side edges of the tile where lines are to cross the tile boundaries. The angles at which the lines cross these boundaries are also selected. (In the illustrated embodiment, these points and angles are selected arbitrarily, although in other embodiments, the choices can be made in conformance with an optimizing design procedure.)

The selected points and angles are then replicated on the corresponding right and top edges of the tile. By this arrangement, lines exiting the top of one tile seamlessly enter the bottom of the adjoining tile at the same angle. Likewise, lines exiting either side of a tile seamlessly join with lines in the laterally adjoining blocks.

Figure 9B:
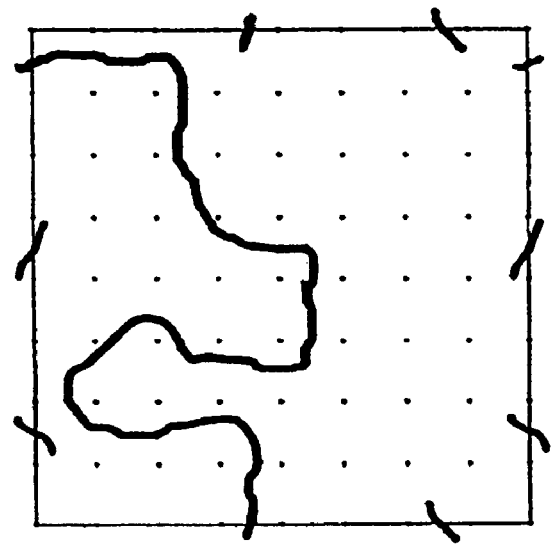
Figure 9C:
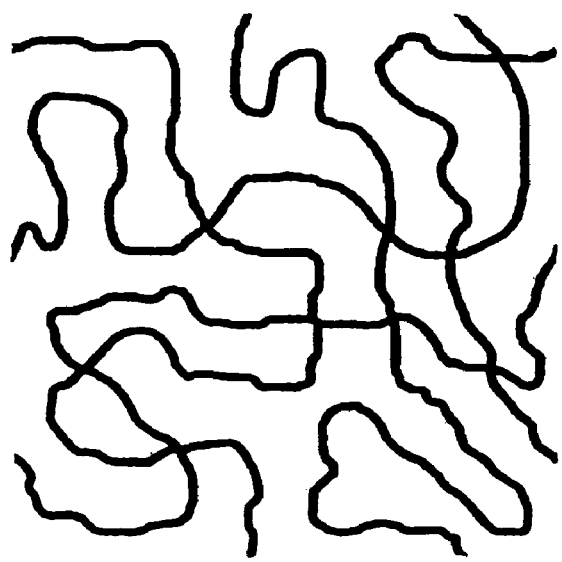

The designer next establishes trial line paths snaking through the tile (FIGS. 9B, 9C), linking arbitrarily matched pairs of points on the tile's edges. (These snaking paths are sometimes termed "worms.") Desirably, these paths pass through each of the 64 component cells forming the tile, with the total path length through each cell being within +/−30% of the average path length through all cells. (This trial routing can be performed with pencil and paper, but more commonly is done on a computer graphics station, with a mouse, light pen, or other input device being manipulated by the designer to establish the routing.) In the illustrated embodiment, the lines have a width of about 30-100 microns, and an average spacing between lines of about 100-400 microns, although these parameters are not critical.

Figure 10:
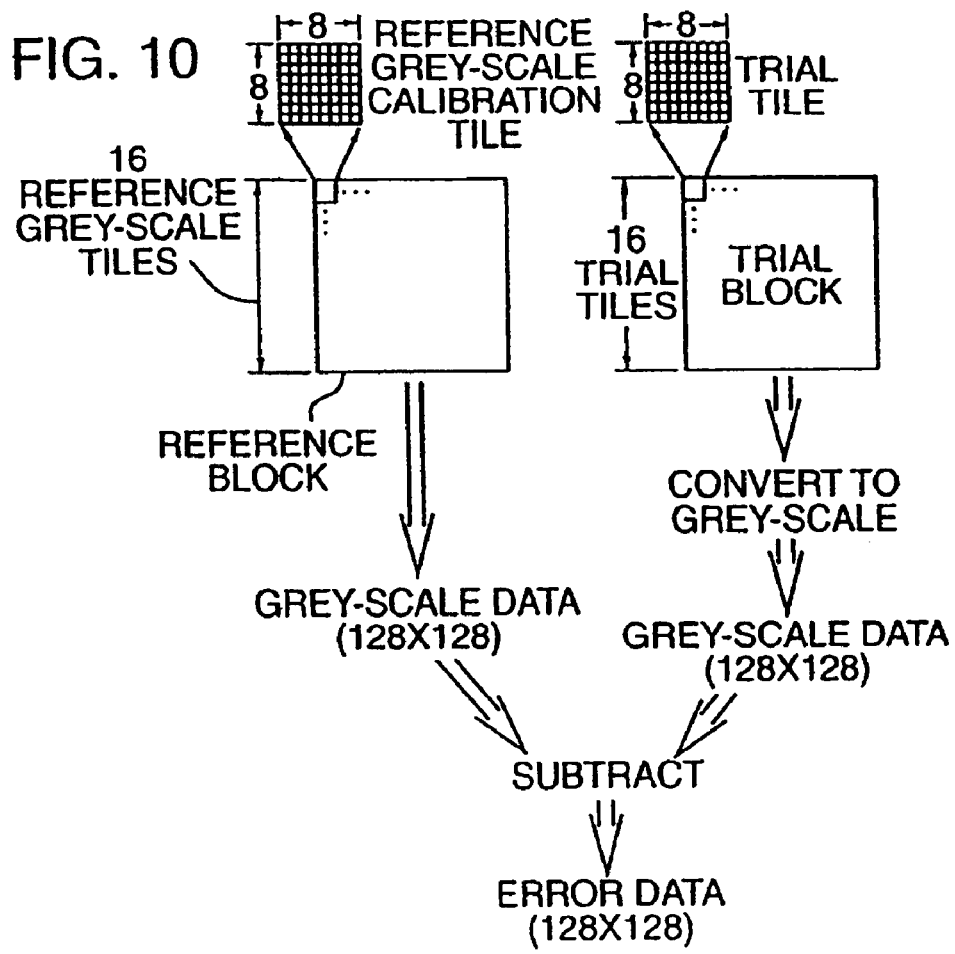
FIG. 10 shows the generation of error data used in designing a weave calibration pattern.

Turning next to FIG. 10, the trial tile is assembled with like tiles to form a 16×16 trial block (3.2 cm on a side), with a repetitive weave pattern formed by replication of the line pattern defined on the 8×8 cell trial tile. This trial block is then converted into grey-scale values. The conversion can be done by scanning a printed representation of the trial block, or by computer analysis of the line lengths and positions. The output is a 128×128 array of grey-scale values, each value corresponding to the luminance of a 250 micron cell within the trial block.

This grey-scale data is compared with grey-scale data provided by assembling 256 of the reference calibration tiles (each an 8×8 array of cells) into a 16×16 calibration pattern block. In particular, the grey-scale array resulting from the trial block is subtracted from the grey-scale array resulting from the reference block, generating a 128×128 array of error values. This error data is used to tweak the arrangement of lines in the trial block.

In cells of the trial calibration block where the error value is positive, the line is too long. That is, the pattern is too dark in those cells (i.e. it has a low luminance grey-scale value), due to a surplus of line length (i.e. too much ink). By shortening the line length in those cells, their luminance is increased (i.e. the cell is lightened). Shortening can be effected by straightening curved arcs, or by relocating a line's entrance and exit points in a cell so less distance is traversed through the cell.

Conversely, in cells where the error value is negative, the line is too short. By increasing the line length in such cells, their luminance is decreased (i.e. the cell is darkened). Increasing the line length through a cell can be accomplished by increasing the curvature of the line in the cell, or by relocating a line's entrance and exit points along the boundary of the cell, so more distance is traversed through the cell.

A computer program is desirably employed to effect the foregoing changes in line routing to achieve the desired darkening or lightening of each cell.

After line positions in the trial calibration block have been tweaked in this fashion, the trial block is again converted to grey-scale values, and again subtracted from the reference block. Again, an array of error values is produced. The positions of the lines are then further tweaked in accordance with the error values.

The foregoing steps of tweaking line routes in accordance with error signals, converting anew into grey-scale, and computing new error values, is repeated until the luminance of the resulting weave pattern in the trial block is arbitrarily close to the luminance of the reference block. Four of five iterations of this procedure commonly suffice to converge on a final calibration block.

(It will be noted that the initial tile pattern created by the designer is done at the tile level—8×8 cells. After the initial trial tile is created, subsequent processing proceeds at the block level (128×128 cells). A common result of the iterative design procedure is that the component tiles lose their uniformity. That is, the pattern of lines in a tile at a corner of the final calibration block will generally be slightly different than the pattern of lines in a tile near the center of the block.)

After the final calibration block pattern has been established as above, the blocks are tiled repetitively over some or all of the security document, and can serve either as a background design element, or as a more apparent element of the design. By printing this weave pattern in an ink color close to the paper substrate color, the patterning is highly unobtrusive. (If a highly contrasting ink color is used, and if the pattern extends over most or all of the security document, it may be desirable to employ a brighter luminance paper than otherwise, since the weave pattern effectively darkens the substrate.)

As noted in my application Ser. No. 08/649,419, the Fourier-Mellin transform has the property that the same output pattern is produced, regardless of rotation or scaling of the input image. The invariant output pattern is shifted in one dimension proportional to image rotation, and shifted in another dimension proportional to image scaling. When an image whose F-M transform is known, is thereafter rotated and/or scaled, the degree of rotation and scaling can be determined by observing the degree of shift of the transformed F-M pattern in the two dimensions. Once the rotation and scale are known, reciprocal processing of the image can be performed to restore the image to its original orientation and scale.

In the above-described embodiment, the calibration block pattern has a known F-M transform. When a security document incorporating such a pattern is scanned (e.g. by a photocopier, a flatbed scanner, a facsimile machine, etc.), the resulting data can be F-M transformed. The known F-M pattern is then identified in the transformed data, and its two-dimensional shift indicates the scale and rotation corruption of the scanned security document data. With these parameters known, misregistration of the security document—including scale and rotation corruption—can be backed-off, and the security document data restored to proper alignment and scale. In this re-registered state, the watermark can be detected. (In alternative embodiments, the original scan data is not processed to remove the scale/rotation effects. Instead, subsequent processing proceeds with the data in its corrupted state, and takes into account the specific corruption factor(s) to nonetheless yield accurate decoding, etc.)

The just-described calibration pattern and design procedure, of course, are just exemplary, and are subject to numerous modifications. The dimensions can be varied at will. It is not essential that the cell size of the calibration tiles match that of the watermark. Nor do the cells sizes need to be integrally related to each other. Nor does the calibration pattern need to be implemented as lines; other ink patterns can alternatively be used to approximate the grey-scale reference pattern There is no requirement that the lines snake continuously through the tiles. A line can connect to just a single edge point of a tile, resulting in a line that crosses that tile boundary, but no other. Or a line can both begin and end in a single tile, and not connect to any other.

While darker lines on a lighter background are illustrated, lighter lines on a darker background can alternatively be employed.

The iterative design procedure can employ the F-M transform (or other transform). For example, the trial block pattern can be transformed to the F-M domain, and there compared with the F-M transform of the reference block. An F-M domain error signal can thus be obtained, and the routing of the lines can be changed in accordance therewith.

Although the illustrated embodiment tweaked the cell-based grey-scales of the calibration block by changing line curvature and position, other luminance changing techniques can be employed. For example, the width of the weave lines can be locally changed, or small ink dots can be introduced into certain cell areas.

The foregoing (and following) discussions contemplate that the watermark and/or calibration pattern is printed at the same time as (indeed, sometimes as part of) the line art on the security document. In many applications it is desirable to provide the calibration pattern on the security document substrate prior to printing. The markings can be ink applied by the manufacturer, or can be embossings applied, e.g., by rollers in the paper-making process. (Such textural marking is discussed further below.) Or, the markings can be applied by the security document printer, as a preliminary printing operation, such as by offset printing. By using an ink color/density that is already closely matched to the underlying tint of the paper stock, the manufacturer of the paper can introduce less tinting during its manufacture. Such tinting will effectively be replaced by the preliminary printing of the watermark/calibration pattern on the blank paper.

Calibration signals entirely different than those detailed above can also be used. Calibration signals that are optimized to detect rotation, but not scaling, can be employed when scaling is not a serious concern. DCT and Fourier transforms provide data that is readily analyzed to determine rotation. A calibration signal can be tailored to stand out in a typically low-energy portion of the transformed spectrum (e.g. a series of fine lines at an inclined angle transforms to a usually vacant region in DCT space), and the scanned image can be transformed to the DCT/Fourier domains to examine any shift in the calibration signal (e.g. a shift in the spatial frequency representation of the inclined lines).

In some security documents, the just-described calibration weave is printed independently of the watermark encoding. In other embodiments, the weave serves as the lines whose widths, locations, etc., are modulated by the watermark data, as detailed herein and in application Ser. No. 09/074,034.

In an illustrative embodiment, the printing of the security document is achieved by intaglio printing. Intaglio is a well known printing process employing a metal plate into which the security document pattern is etched or engraved. Ink is applied to the plate, filling the etched recesses/grooves. Paper is then pressed into the plate at a very high pressure (e.g. 10-20 tons), both raised-inking and slightly deforming (texturing) the paper.

Although ink is commonly used in the intaglio process, it need not be in certain embodiments of the present invention. Instead, the paper texturing provided by the intaglio pressing—alone—can suffice to convey watermark data. (Texturing of a medium to convey watermark information is disclosed in various of my prior applications, including allowed application Ser. No. 08/438,159.)

To illustrate, an intaglio plate was engraved (using a numerically controlled engraving apparatus), to a depth of slightly less than 1 mm, in accordance with a 3.2×3.2 cm. noise-like block of watermark data. The watermark data was generated as described above (e.g. 128 bits of data, randomly distributed in a 128×128 cell array), and summed with a correspondingly-sized block of calibration data (implemented as discrete grey-scaled cells, rather than the line/weave pattern detailed above). In this embodiment, the data was not kept within a small range of digital numbers, but instead was railed to a full 8-bit dynamic range.)

This textured paper was placed—textured extrema down—on the platen of an conventional flatbed scanner (of the sort commonly sold as an accessory for personal computers), and scanned. The resulting image data was input to Adobe's Photoshop image processing software, version 4.0, which includes Digimarc watermark reader software. The software readily detected the watermark from the textured paper, even when the paper was skewed on the scanner platen.

The optical detection process by which a seemingly blank piece of paper can reliably convey 128 bits of data through an inexpensive scanner has not been analyzed in detail; the degree of localized reflection from the paper may be a function of whether the illuminated region is concave or convex in shape. Regardless of the explanation, it is a remarkable phenomenon to witness.

Experiments have also been conducted using traditional opaque inks. Again, the watermark can reliably be read.

In addition to the just-described technique for "reading" intaglio markings by a conventional scanner, a variant technique is disclosed in Van Renesse, Optical Inspection Techniques for Security Instrumentation, SPIE Proc. Vol. 2659, pp. 159-167 (1996), and can alternatively be used in embodiments according to the present invention.

Although intaglio is a preferred technique for printing security documents, it is not the only such technique. Other familiar techniques by which watermarks and calibration patterns can be printed include offset litho and letterpress, as well as inkjet printing, xerographic printing, etc. And, as noted, textured watermarking can be effected as part of the paper-making process, e.g. by high pressure textured rollers.

In still other embodiments, the watermark and/or calibration ("information") patterns are not printed on the security document substrate, but rather are formed on or in an auxiliary layer that is laminated with a base substrate. If a generally clear laminate is used, the information patterns can be realized with opaque inks, supplementing the design on the underlying substrate. Or the added information can be encoded in textural form. Combinations of the foregoing can similarly be used.

To retrofit existing security document designs with information patterns, the existing artwork must be modified to effect the necessary additions and/or tweaks to localized security document luminance and/or texture.

When designing new security documents, it would be advantageous to facilitate integration of information patterns into the basic design. One such arrangement is detailed in the following discussion.

Many security documents are still designed largely by hand. A designer works at a drafting table or computer workstation, and spends many hours laying-out minute (e.g. 5 mm×5 mm) excerpts of the design. To aid integration of watermark and/or calibration pattern data in this process, an accessory layout grid can be provided, identifying the watermark "bias" (e.g. −3 to +3) that is to be included in each 250 micron cell of the security document. If the accessory grid indicates that the luminance should be slightly increased in a cell (e.g. 1%), the designer can take this bias in mind when defining the composition of the cell and include a touch less ink than might otherwise be included. Similarly, if the accessory grid indicates that the luminance should be somewhat strongly increased in a cell (e.g. 5%), the designer can again bear this in mind and try to include more ink than might otherwise be included. Due to the substantial redundancy of most watermark encoding techniques, strict compliance by the designer to these guidelines is not required. Even loose compliance can result in artwork that requires little, if any, further modification to reliably convey watermark and/or calibration information.

Such "designing-in" of embedded information in security documents is facilitated by the number of arbitrary design choices made by security document designers. A few examples from U.S. banknotes include the curls in the presidents' hair, the drape of clothing, the clouds in the skies, the shrubbery in the landscaping, the bricks in the pyramid, the fill patterns in the lettering, and the great number of arbitrary guilloche patterns and other fanciful designs, etc. All include curves, folds, wrinkles, shadow effects, etc., about which the designer has wide discretion in selecting local luminance, etc. Instead of making such choices arbitrarily, the designer can make these choices deliberately so as to serve an informational—as well as an aesthetic—function.

To further aid the security document designer, data defining several different information-carrying patterns (both watermark and/or calibration pattern) can be stored on mass storage of a computer workstation and serve as a library of design elements for future designs. The same user-interface techniques that are employed to pick colors in image-editing software (e.g. Adobe Photoshop) and fill textures in presentation programs (e.g. Microsoft PowerPoint) can similarly be used to present a palette of information patterns to a security document designer. Clicking on a visual representation of the desired pattern makes the pattern available for inclusion in a security document being designed (e.g. filling a desired area).

In the embodiment earlier-described, the calibration pattern is printed as a visible artistic element of the security document. However, the same calibration effect can be provided subliminally if desired. That is, instead of generating artwork mimicking the grey-scale pattern of the reference calibration block, the reference calibration block can itself be encoded into the security document as small changes in local luminance. In many such embodiments, the bias to localized document luminance due to the calibration pattern is simply added to the bias due to the watermark data, and encoded like the watermark data (e.g. as localized changes to the width or position of component line-art lines, as inserted ink droplets, etc.).

The uses to which the 128 bits of watermark data can be put in security documents are myriad. Many are detailed in the materials cited above. Examples include postal stamps encoded with their value, or with the zip code of the destination to which they are addressed (or from which they were sent); banknotes encoded with their denomination, and their date and place of issuance; identification documents encoded with authentication information by which a person's identify can be verified; etc., etc.

The encoded data can be in a raw form—available to any reader having the requisite key data (in watermarking techniques where a key data is used), or can be encrypted, such as with public key encryption techniques, etc. The encoded data can embody information directly, or can be a pointer or an index to a further collection of data in which the ultimate information desired is stored.

Figure 11:
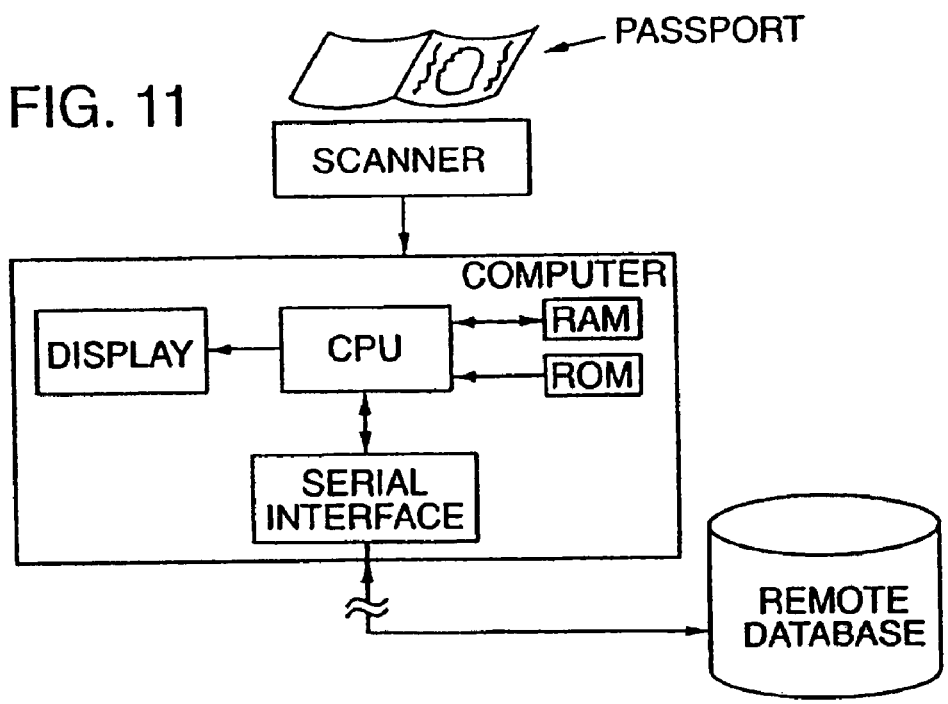
FIG. 11 is a block diagram of a passport processing station.

For example, watermark data in a passport need not encode a complete dossier of information on the passport owner. Instead, the encoded data can include key data (e.g. a social security number) identifying a particular record in a remote database in which biographical data pertaining to the passport owner is stored. A passport processing station employing such an arrangement is shown in FIG. 11.

To decode watermark data, the security document must be converted into electronic image data for analysis. This conversion is typically performed by a scanner.

Scanners are well known, so a detailed description is not provided here. Suffice it to say that scanners conventionally employ a line of closely spaced photodetector cells that produce signals related to the amount of the light reflected from successive swaths of the document. Most inexpensive consumer scanners have a resolution of 300 dots per inch (dpi), or a center to center spacing of component photodetectors of about 84 microns. Higher quality scanners of the sort found in most professional imaging equipment and photocopiers have resolutions of 600 dpi (42 microns), 1200 dpi (21 microns), or better.

Taking the example of a 300 dpi scanner (84 micron photodetector spacing), each 250 micron region 12 on the security document will correspond to about a 3×3 array of photodetector samples. Naturally, only in rare instances will a given region be physically registered with the scanner so that nine photodetector samples capture the luminance in that region, and nothing else. More commonly, the image is rotated with respect to the scanner photodetectors, or is longitudinally misaligned (i.e. some photodetectors image sub-parts of two adjoining regions). However, since the scanner oversamples the regions, the luminance of each region can unambiguously be determined.

In one embodiment, the scanned data from the document is collected in a two dimensional array of data and processed to detect the embedded calibration information. The scanner data is then processed to effect a virtual re-registration of the document image. A software program next analyzes the statistics of the re-registered data (using the techniques disclosed in my prior writings) to extract the bits of the embedded data.

(Again, the reference to my earlier watermark decoding techniques is exemplary only. Once scanning begins and the data is available in sampled form, it is straightforward to apply any other watermark decoding technique to extract a correspondingly-encoded watermark. Some of these other techniques employ domain transformations (e.g. to wavelet, DCT, or Fourier domains, as part of the decoding process).)

In a variant embodiment, the scanned data is not assembled in a complete array prior to processing. Instead, it is processed in real-time, as it is generated, in order to detect embedded watermark data without delay. (Depending on the parameters of the scanner, it may be necessary to scan a half-inch or so of the document before the statistics of the resulting data unambiguously indicate the presence of a watermark.)

In other embodiments, hardware devices are provided with the capability to recognize embedded watermark data in any document images they process, and to respond accordingly.

One example is a color photocopier. Such devices employ a color scanner to generate sampled (pixel) data corresponding to an input media (e.g. a dollar bill). If watermark data associated with a security document is detected, the photocopier can take one or more steps.

One option is simply to interrupt copying, and display a message reminding the operator that it is illegal to reproduce currency.

Another option is to dial a remote service and report the attempted banknote reproduction. Photocopiers with dial-out capabilities are known in the art (e.g. U.S. Pat. No. 5,305,199) and are readily adapted to this purpose. The remote service can be an independent service, or can be a government agency.

Yet another option is to permit the copying, but to insert forensic tracer data in the resultant copy. This tracer data can take various forms. Steganographically encoded binary data is one example. An example is shown in U.S. Pat. No. 5,568,268. The tracer data can memorialize the serial number of the machine that made the copy and/or the date and time the copy was made. To address privacy concerns, such tracer data is not normally inserted in all photocopied output, but is inserted only when the subject being photocopied is detected as being a security document. (An example of such an arrangement is shown in FIG. 12.)

Desirably, the scan data is analyzed on a line-by-line basis in order to identify illicit photocopying with a minimum of delay. If a security document is scanned, one or more lines of scanner output data may be provided to the photocopier's reprographic unit before the recognition decision has been made. In this case the photocopy will have two regions: a first region that is not tracer-marked, and a second, subsequent region in which the tracer data has been inserted.

Photocopiers with other means to detect not-to-be-copied documents are known in the art, and employ various response strategies. Examples are detailed in U.S. Pat. Nos. 5,583,614, 4,723,149, 5,633,952, 5,640,467, and 5,424,807.

Another hardware device that can employ the foregoing principles is a standalone scanner. A programmed processor (or dedicated hardware) inside the scanner analyzes the data being generated by the device, and responds accordingly.

Yet another hardware device that can employ the foregoing principles is a printer. A processor inside the device analyzes graphical image data to be printed, looking for watermarks associated with security documents.

For both the scanner and printer devices, response strategies can include disabling operation, or inserting tracer information. (Such devices typically do not have dial-out capabilities.)

Again, it is desirable to process the scanner or printer data as it becomes available, so as to detect any security document processing with a minimum of delay. Again, there will be some lag time before a detection decision is made. Accordingly, the scanner or printer output will be comprised of two parts, one without the tracer data, and another with the tracer data.

Many security documents already include visible structures that can be used as aids in banknote detection (e.g. the seal of the issuer, and various geometrical markings on U.S. currency). In accordance with a further aspect of the present invention, a security document is analyzed by an integrated system that considers both the visible structures and watermark-embedded data.

Visible security document structures can be sensed using known pattern recognition techniques. Examples of such techniques are disclosed in U.S. Pat. Nos. 5,321,773, 5,390,259, 5,533,144, 5,539,841, 5,583,614, 5,633,952, 4,723,149, 5,692,073, and 5,424,807 and laid-open foreign applications EP 649,114 and EP 766,449.

In photocopiers (and the like) equipped to detect both visible structures and watermarks from security documents, the detection of either can cause one or more of the above-noted responses to be initiated (FIG. 12).

Again, scanners and printers can be equipped with a similar capability—analyzing the data for either of these security document hallmarks. If either is detected, the software (or hardware) responds accordingly.

Identification of security documents by watermark data provides an important advantage over recognition by visible structures—it cannot so easily be defeated. A security document can be doctored (e.g. by white-out, scissors, or less crude techniques) to remove/obliterate the visible structures. Such a document can then be freely copied on either a visible structure-sensing photocopier or scanner/printer installation. The removed visible structure can then be added back in via a second printing/photocopying operation. If the printer is not equipped with security document-disabling capabilities, image-editing tools can be used to insert visible structures back into image data sets scanned from such doctored documents, and the complete document can then be freely printed. By additionally including embedded watermark data in the security document, and sensing same, such ruses will not succeed.

(A similar ruse is to scan a security document image on a non-security document-sensing scanner. The resulting image set can then be edited by conventional image editing tools to remove/obliterate the visible structures. Such a data set can then be printed—even on a printer/photocopier that examines such data for the presence of visible structures. Again, the missing visible structures can be inserted by a subsequent printing/photocopying operation.)

Desirably, the visible structure detector and the watermark detector are integrated together as a single hardware and/or software tool. This arrangement provides various economies, e.g., in interfacing with the scanner, manipulating pixel data sets for pattern recognition and watermark extraction, electronically re-registering the image to facilitate pattern recognition/watermark extraction, issuing control signals (e.g. disabling) signals to the photocopier/scanner, etc.

While the foregoing apparatuses are particularly concerned with counterfeit deterrence, the embedded markings can also serve other functions. Examples include banknote processing machines that perform denomination sorting, counterfeit detection, and circulation analysis functions. (I.e., banknotes with certain markings may be distributed through known sources, and their circulation/distribution can subsequently be monitored to assist in macro-economic analyses.)

From the foregoing, it will be recognized that various embodiments provide techniques for embedding multi-bit binary data in security documents, and provide for the reliable extraction of such data even in the presence of various forms of corruption (e.g. scale and rotation).

(To provide a comprehensive disclosure without unduly lengthening the following specification, applicants incorporate by reference the patents and applications cited above.)

Having described and illustrated the principles of my invention with reference to several illustrative embodiments, it will be recognized that these embodiments are exemplary only and should not be taken as limiting the scope of my invention. Guided by the foregoing teachings, it should be apparent that other watermarking, decoding, and anti-counterfeiting technologies can be substituted for, and/or combined with, the elements detailed above to yield advantageous effects. Other features disclosed in my earlier applications can similarly be employed in embodiments of the technology detailed herein. (Thus, I have not here belabored application of each of the techniques disclosed in my earlier applications—e.g. use of neural networks for watermark detectors—to the present subject matter since same is fairly taught by reading the present disclosure in the context of my earlier work.)

While the technology has been described with reference to embodiments employing regular rectangular arrays of cells, those skilled in the art will recognize that other arrays—neither rectangular nor regular—can alternatively be used.

While the embodiments have described the calibration patterns as adjuncts to digital watermarks—facilitating their detection, such patterns have utility apart from digital watermarks. One example is in re-registering scanned security document image data to facilitate detection of visible structures (e.g. detection of the seal of the issuer, using known pattern recognition techniques). Indeed, the use of such calibration patterns to register both watermark and visible structure image data for recognition is an important economy that can be gained by integration a visible structure detector and a watermark detector into a single system.

Although security documents have most commonly been printed on paper (e.g. cotton/linen), other substrates are gaining in popularity (e.g. synthetics, such as polymers) and are well (or better) suited for use with the above-described techniques.

The embodiments detailed above can be implemented in dedicated hardware (e.g. ASICs), programmable hardware, and/or software.

In view of the many possible embodiments to which the principles of the above-described technology may be put, it should be recognized that the detailed embodiments are illustrative only and should not be taken as limiting the scope of my invention.

Image Patterns that Constitute Digital Watermarks

Steganographic techniques for unobtrusively embedding digital data in images are well known. For example, widely used image editing programs such as Adobe PhotoShop which is marketed by Adobe Corporation, CorelPHOTO-PAINT which is marketed by Corel Corporation, and Microgrfix Webtricity which is marketed by Micrographic Corporation contain plug-ins or subroutines which can add watermarks to images and which can read watermarks. Systems for adding watermarks to images are described in many patents including U.S. Pat. Nos. 5,636,292, 5,862,260, and 5,748,783. Such systems are also described in the technical literature such as in the "Communications of the ACM" published July 1998 Vol. 41, No 7 pages 31 to 77. The teaching and information in the above referenced material is hereby incorporated herein as background information.

In some watermark detecting and reading systems the original image is considered to be noise when the system is detecting and reading the actual watermark data. A major task faced by the designers of watermark reading systems is how to detect a relatively weak watermark signal in view of the noise signal created by the image data itself.

Many documents and images include a background image. In some documents such as checks, passports, etc. the background image is used as a security feature to inhibit alteration or duplication. In many documents, the background consists of a series of lines. Such lines are designed to both present a pleasing appearance and to inhibit duplication or alteration of the documents. U.S. patent application Ser. No. 09/074,034, filed May 6, 1998 and 09/127,502, filed Jul. 31, 1998 (which correspond to PCT/US99/08252, now published as WO99/53428 and PCT/US99/14532, now published as WO00/07356) describe how the width of lines can be varied to carry a watermark.

Figure 13:
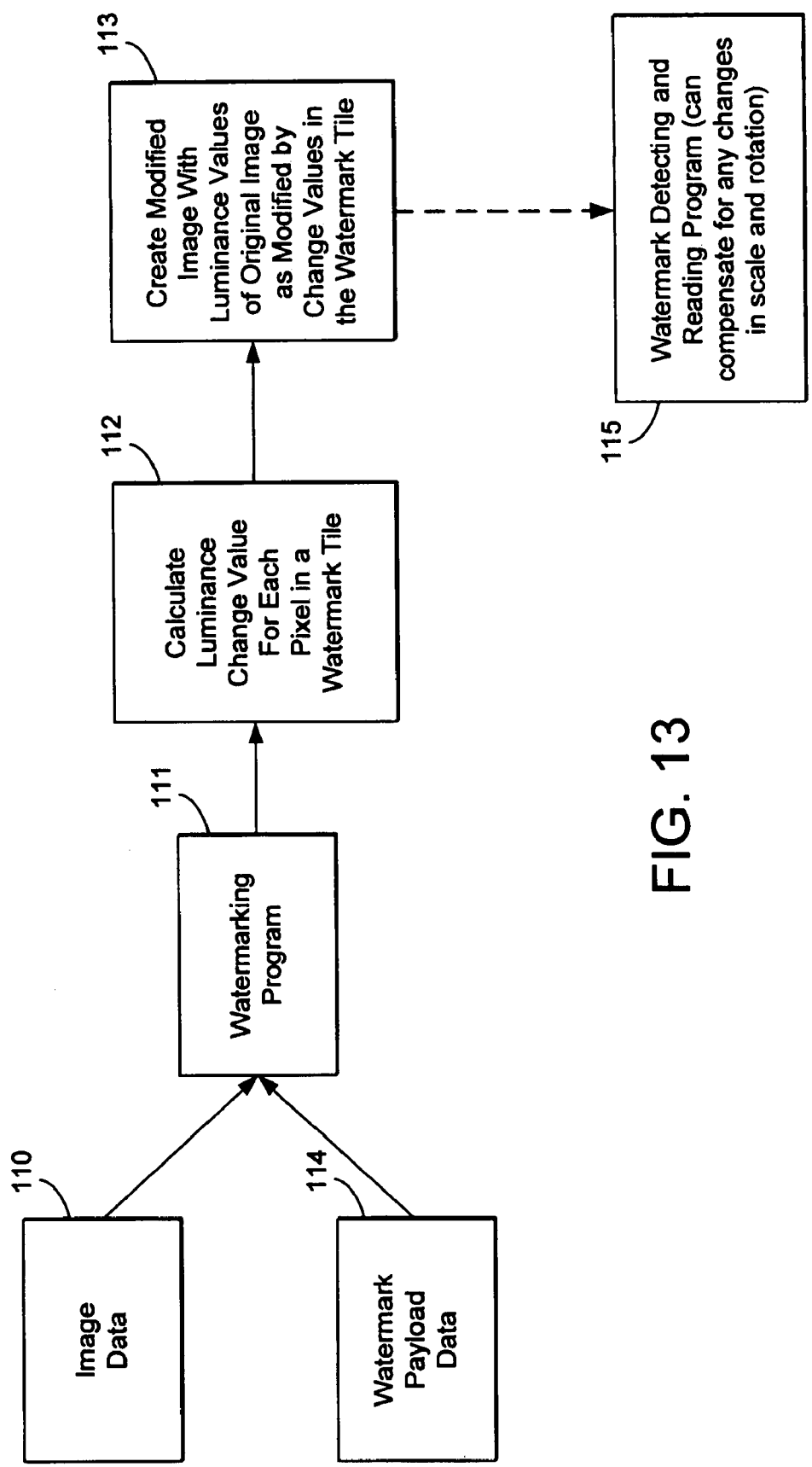
FIG. 13 shows a prior art watermarking system.

Some digital watermarking technology modifies an image by changing the luminance values of the pixels in the image in such a way that the modified image carries digital data (referred to as watermark payload data). As shown in FIG. 13, one example of a watermarking system begins with an image 110 and watermark payload data 114. A watermarking program 111 calculates a luminance change value 112 for each pixel in a watermark tile. The input image is divided into areas corresponding to the size of the watermark tile. A modified image is generated by taking the luminance values in each area of the original image and changing it by an amount equal to the change values in the corresponding position in the watermark tile. Watermark detecting and reading program 114 can read the watermark payload data by detecting the changes in luminance values while considering the values from the original image as "noise". Watermark detecting and reading program 114 can read the payload data not withstanding changes in scale and rotation of the modified image. Such a system is for example shown in co-pending patent application Ser. No. 09/503,881 filed Feb. 14, 2000 (the material in which is hereby incorporated herein by reference).

This disclosure describes a method for designing a pattern of lines in such a manner that the pattern itself carries watermark payload data. That is, lines are drawn so that the resulting image carries watermark data. This is in contrast to systems in which watermark payload data is used to modify a preexisting image. In one embodiment, a conventional watermarking program is used to calculate luminance change values in a watermark tile (i.e. luminance change values corresponding to a desired watermark payload). The luminance change values are used to control the formation of lines on an output image. The weight, length and character (i.e. straight or wavy etc.) of the lines can be selected to create any desired aesthetic effect so long as the placement of the lines is controlled by the luminance change values in the watermark tile. Lines are drawn to form an image in such a way that the placement and direction of the lines carry watermark data. The payload data can be read from an image created according to this method using a conventional watermark reading program.

As a first step in this embodiment, the luminance change values in a watermark tile are calculated using a watermarking program. Next the values so calculated are quantified into a relative small number of levels. For example, the watermarking change values calculated by the watermarking program may have 256 different values (0 to 255). This embodiment takes those values and quantifies them into ten different levels. An output image is divided into areas called bumps, one bump for each pixel in the watermark payload tile. For example, each bump area in the output image could be a rectangular array of pixels. Each bump area in the output is given an index value corresponding to the luminance change value of the corresponding pixel in the payload tile area. Starting at an arbitrary bump area in the output image, a line is drawn to the surrounding bump area with the highest index value and the index value of the bump area where the line started is decreased by one. The process then repeats from the bump area where the line ended. The process can stop when all bump areas have reached an index value of zero, or sooner if a less robust watermark is acceptable.

One embodiment of the method takes the luminance change values in a watermark tile that are calculated by a watermarking program and uses these values to control the construction of lines on an output image. The calculation of the luminance change values may be calculated using existing watermarking programs. For example, the luminance change values can be calculated as described in patent application serial number Ser. No. 09/503,881 filed Feb. 14, 2000, which is hereby incorporated herein by reference. It is noted that in some systems, the watermark data (i.e. the watermark tile) is replicated many times over an image. The first embodiment described herein does not duplicate or replicate the watermark data in the output image; however, as explained later in other embodiments, the watermark data can be replicated in multiple patterns. The watermark payload data can be read from the output image using a conventional watermark reading program.

Figure 14:
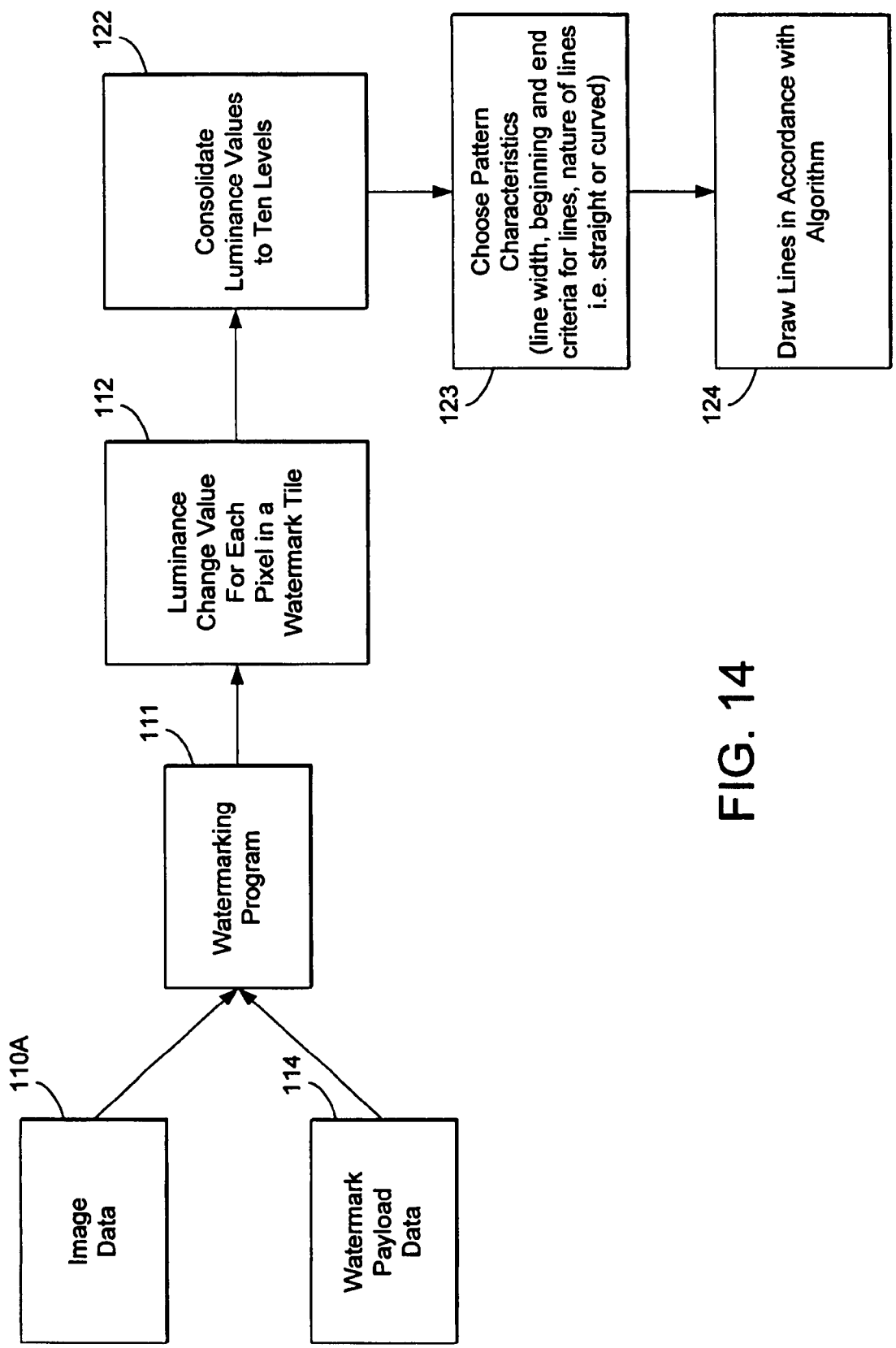
FIG. 14 is an overall system diagram.

As shown in FIG. 14, an embodiment utilizes a watermarking program 111 to calculate luminance change values 112 for each pixel in a watermark tile. The luminance change values 112 in the watermark tile corresponding to a particular watermark payload 114. The original image (herein called a pseudo image) presented to the watermarking program 112 can be a uniformly gray image 110A, that is, an image which has a selected luminance value which is uniform over the entire image. The embodiment described here only uses a pseudo image 110A for the convenience since conventional watermarking programs begin with an image. The effect is the same as if there were no image. In alternate embodiments, the watermark change values 112 could be calculated directly without need for a pseudo image 110A.

The luminance change values in a watermark tile calculated by prior art watermarking program 111 has 256 (0 to 255) luminance levels. To simplify operation of the system, these values are quantified into a much smaller number of levels. For example, the 256 levels can be quantified into ten levels as indicated by box 122 in FIG. 14. The number of levels used (and in fact whether or not there is any reduction in the number of levels) is determined by the degree of complexity one is willing to have in the program. One could use all the levels in the normal watermark tile; however, such a program would require much more time to generate a pattern. Alternately, one could design a watermarking program that only generates ten change values. Such a program would in effect be simpler than the watermarking programs now incorporated in commercial software programs such as those previously referenced.

One must choose the characteristics of the lines one wants to use. A significant advantage is that the characteristics of the lines can be chosen for aesthetic reasons. For purposes of simplicity of illustration, the lines chosen for the illustrative example shown herein are straight and which have a weight of 4 points. Alternative embodiments can use many different types of lines as explained later.

Figure 15:
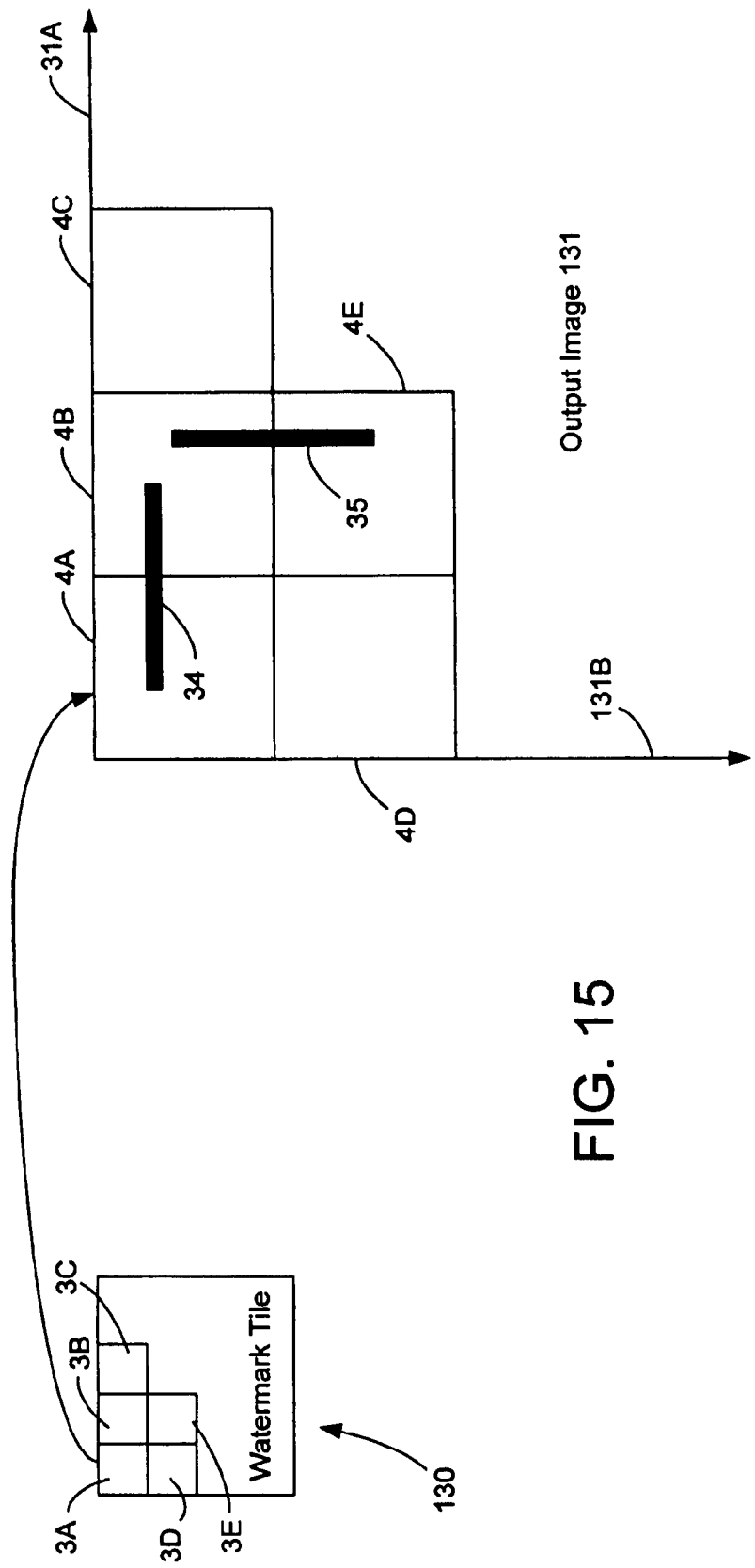
FIG. 15 illustrates the correspondence between the luminance values in a watermark tile and areas in the output image.

As shown in FIG. 15, this embodiment uses a watermark tile 130 created by a watermarking program 111. The luminance change values in the watermark tile 130 are used to control the drawings of lines in an output image 135. For convenience and clarity of illustration only five pixels 3A to 3E are illustrated in FIG. 15. It should be understood that the watermark tile has many more pixels than shown. For example, a watermark tile generated by a conventional watermarking program has over one thousand pixels. The particular and exact size of the watermark tile is of no particular significance; however, it does affect the number of areas in the output image.

The output image is divided into areas or bumps as shown in FIG. 15. For reference the areas or bumps that are illustrated in FIG. 15 are designated as 4A, 4B, 4C, 4D and 4E. Each area can for example be a block of pixels. The arrows 131A and 131B in FIG. 15 illustrate that the output image has many more area than the five areas 4A to 4E explicitly shown in FIG. 15. There is one area in output image 131 for each pixel in watermark tile 130.

The luminance change values in watermark tile 130 are first quantified into ten levels as indicated by block 122 in FIG. 14. In one embodiment, the luminance change values in watermark tile 130 are generated by a conventional watermarking program, and have luminance change values that range from 0 to 255. It is difficult to deal with that many levels with the present algorithm and it has been found that satisfactory results can be obtained by quantifying the values into many less levels. For example, in one embodiment, the luminance values in the watermark tile are quantified into ten levels. That is, the values from 0 to 255 are divided into ten levels, and each pixel is assigned an index value depending upon which range its luminance change value falls into. (it is noted that the number ten is arbitrary and more or less levels can be selected to meet the needs of a particular embodiment).

Figure 17:
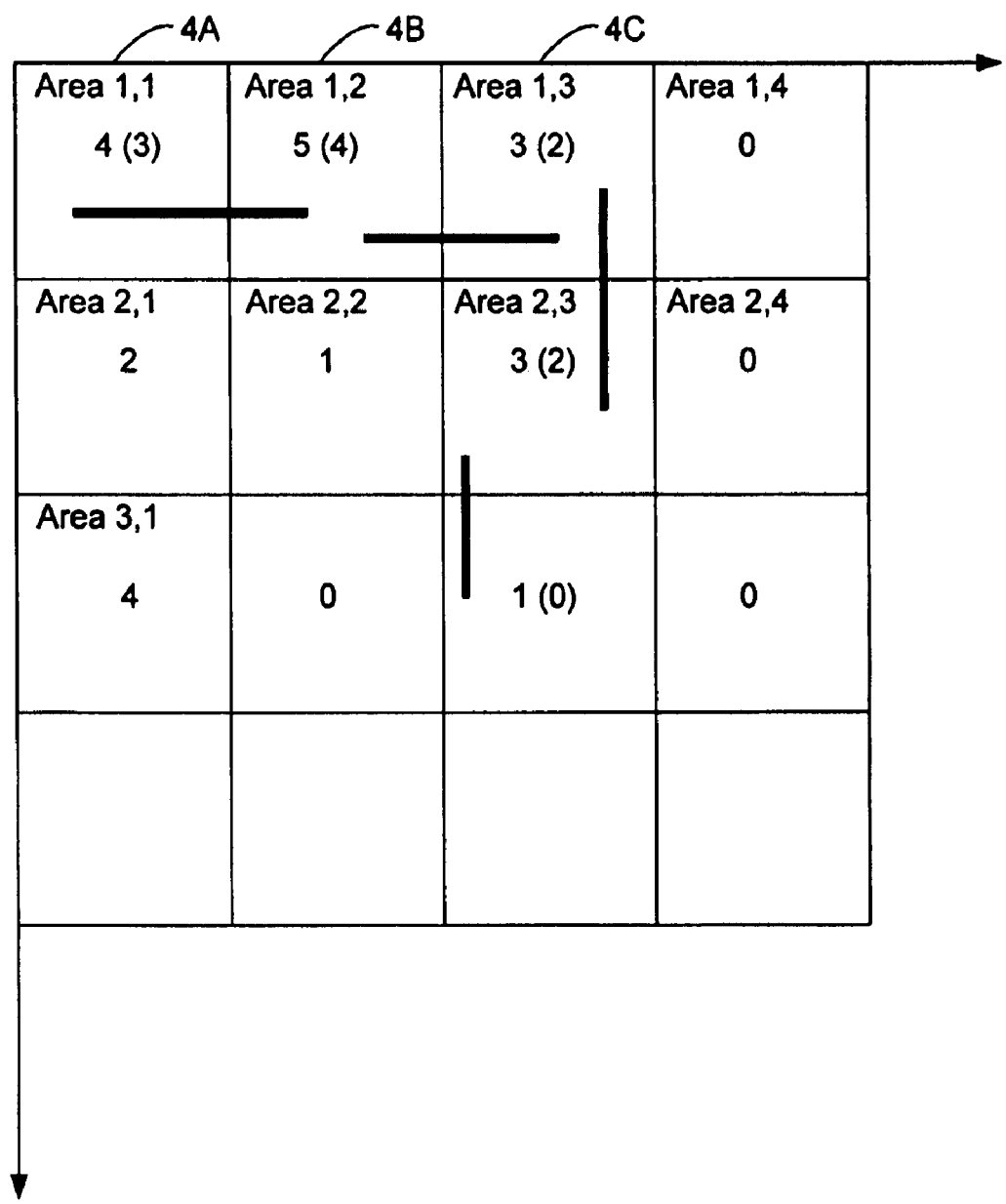
FIG. 17 shows the lines in an output image.

The output image has one area (or bump) for each pixel in the watermark tile and each area in the output image corresponds to one pixel in the watermark tile. The index value calculated for each pixel in the watermark tile is assigned to the corresponding area in the output image. FIG. 17 shows the areas in output image 131 in additional detail. In FIG. 17, the areas are referenced using a conventional matrix notation. For example area 4A is designated as area 1,1, area 4B is designated area 1,2 etc. The starting index value for each area is the index value for the corresponding pixel in the watermark tile. The starting index value for each area is given by the number in bold type in FIG. 17.

The characteristics of the lines in the output must be chosen as indicated by block 123 in FIG. 14. For purposes of simplicity, the example described here utilizes lines that are straight with a weight of four pixels. However, depending upon the artistic effect desired, lines with a wide range of characteristics can be chosen. For example lines that have waves at selected frequencies can be used. Dotted lines can be used. Very thin lines or very heavy lines can be used. Lines that are tapered in width can be used. The above are merely a few examples of the types of lines that can be used to achieve desired artistic effects. However, for ease of illustration, in the example explained here, straight lines with a weight of four pixels are used.

Figure 16:
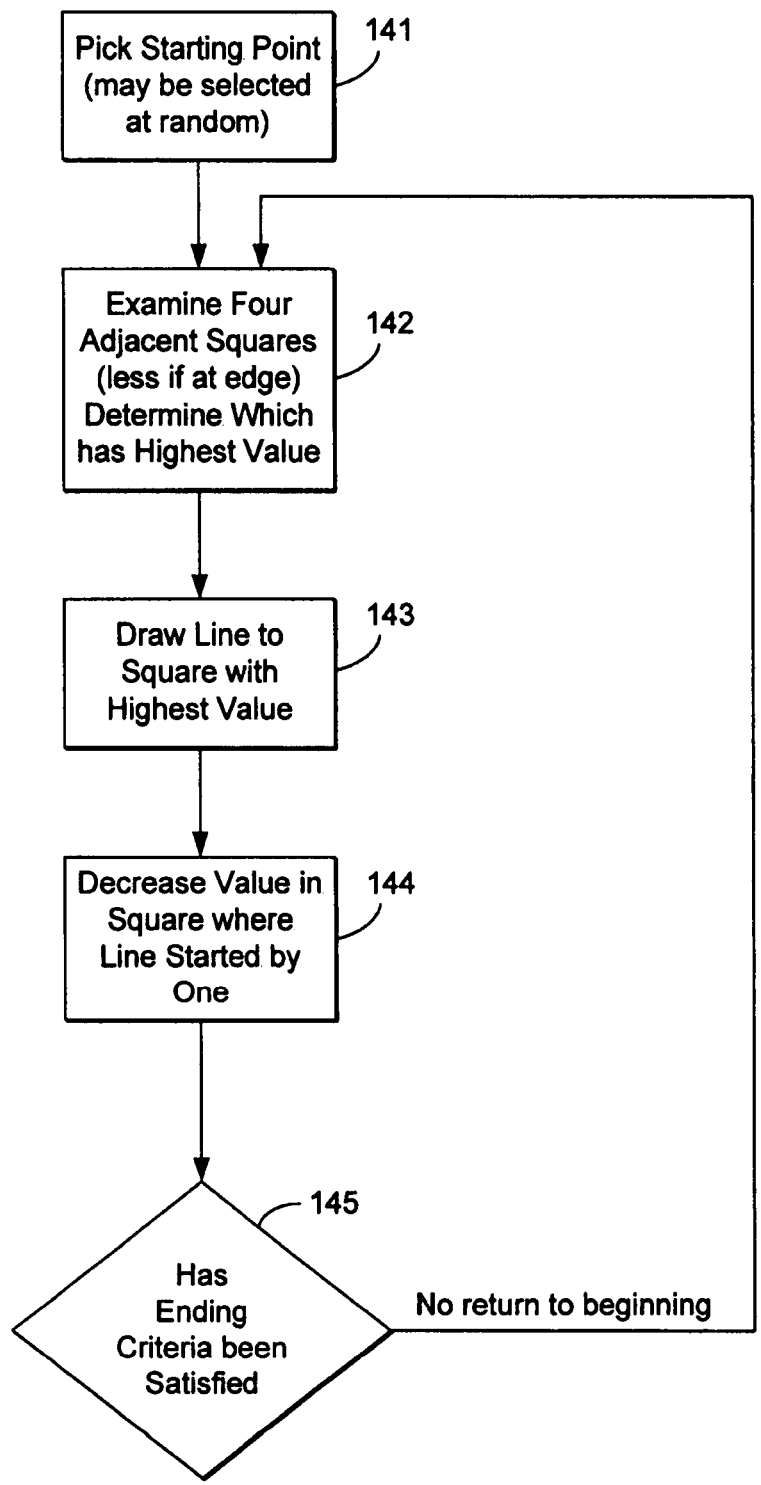
FIG. 16 is a flow diagram of an embodiment.

Lines are drawn in the output image using the algorithm shown in FIG. 16. First, a starting point is picked as indicated by block 144. For purposes of the example described here, area 1,1 is chosen as the starting point. It is however, noted that the location of the starting point can be chosen arbitrarily. Next as indicated by block 142, the index values of the area adjacent to the starting area are examined and the area with the highest index value is selected. In the present example, there are only two adjacent areas, namely areas 1,2 and 2,1. Area 1,2 has an index value of 5 and area 2,1 has an index value of 2. A line is drawn from the starting area to the adjacent area with the highest index value as indicated by block 143. In this case area 1,2 is the adjacent area with the highest index value. The starting location of the line can be chosen randomly. For simplicity in the present embodiment, lines are drawn only horizontally or vertically; however, in alternative embodiments, lines can be drawn at angles selected randomly or according to any desired pattern. The length of the lines can be chosen randomly so long as a line begins and ends in the designated area.

After a line is drawn from one square to another square, the index value of the square where the line started is decreased by one as indicated by block 145. This is shown in FIG. 17 by the numbers in parenthesis. Hence for the line described above, the index value for area 1,1 is reduced from 4 to 3. The process then repeats. Area 1,3 is the area adjacent to area 1,2 that has the high index value (excluding the area where the line to area 1,2 originated). A line is therefore drawn from area 1,2 to area 1,3 and the index value of area 1,2 is reduced from 5 to 4. Following the same algorithm, a line is next drawn to area 2,3 and then a line is drawn to area 3,2.

The process can continues until all areas have an index of zero. However, it has been found that the process can be stopped after the number of lines drawn equals the number of squares. Other criteria can be used to determine when to stop the process. Basically, by trial and error, one can determine when a watermark with sufficient intensity has been embedded in the image or when the desired artistic effect has been achieved. If prior to the time one cares to terminate the process, one arrives at a point where all the adjacent areas have an index value of zero, one can merely restart the process from an arbitrary location. Likewise if one arrives at a point where all the adjacent areas have the same index value, one can arbitrarily choose where to draw a line.

Figure 18:
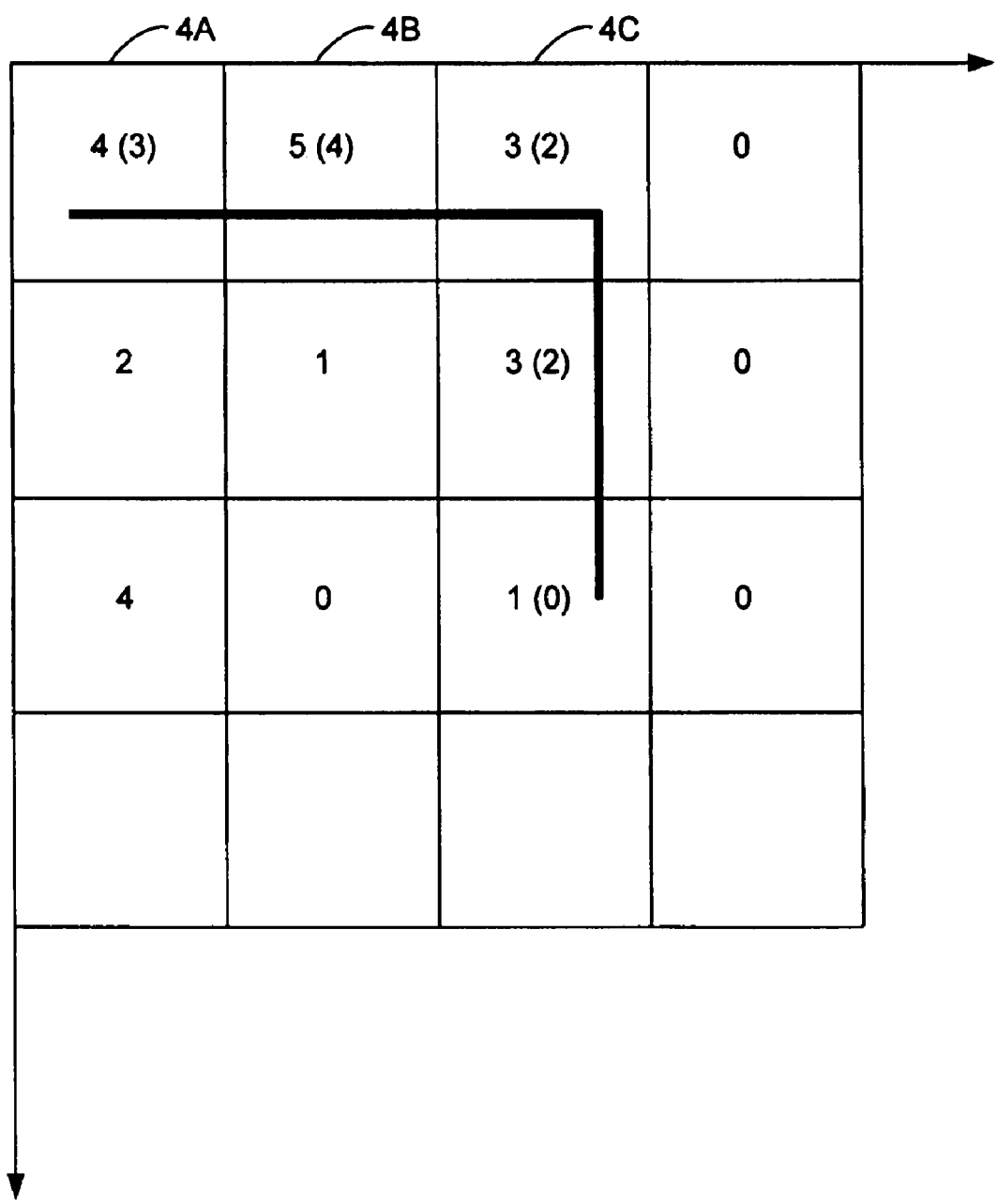
FIG. 18 shows an alternative arrangement of lines in an output image.
Figure 19:
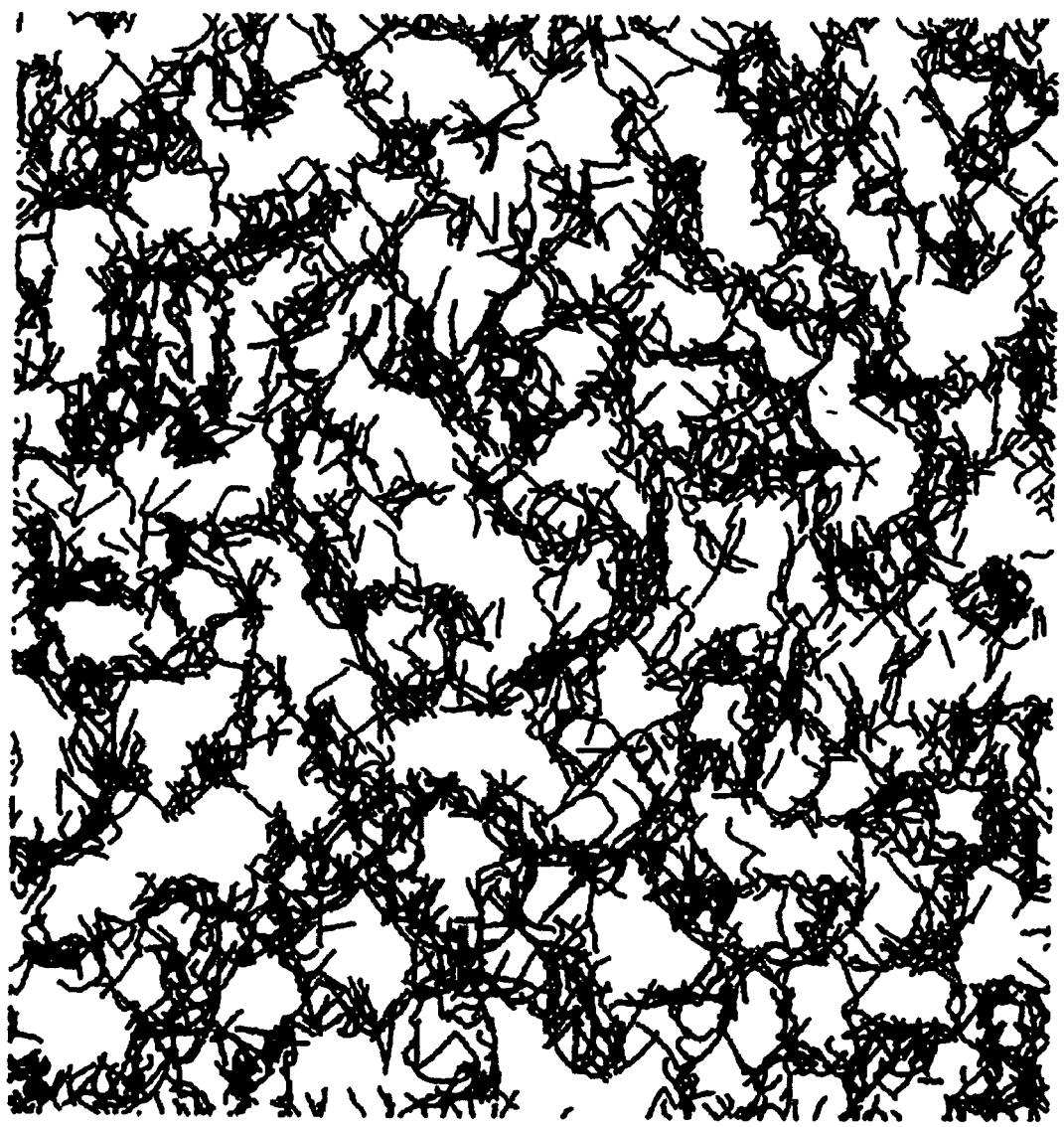
FIG. 19 is an overall diagram of an output image.

In the embodiment shown, the lines begin at random locations. FIG. 18 shows an example where each line begins from the terminal point of the previous line. Again here the length of the lines is chosen randomly.

In the embodiment shown above, lines are drawn between areas in the output image. It is noted that artifacts other than lines could be used. For example, instead of lines, one could use circles, or stars, or small images of birds. In fact one can use any artifact that would create a change in luminance, which could be detected by a watermark reading program.

Conventional watermarking programs redundantly encode the watermark data in an image. This increases reliability and robustness of the watermark. Likewise with the present embodiment, a pattern could be repeated in an output image. The repeated pattern could be the same pattern, or it could be a different pattern carrying the same watermark. That is, one could have multiple identical patterns in an output image. Alternatively, one could have multiple patterns which differ from each other but which carry the same watermark payload data. For example, different patterns can be generated by merely starting the process at a different location in the image. Alternatively, one could have different patterns using different types of lines, or for example patterns where the starting area for the line drawing algorithm was at a different area in the output image. The size of the areas or bumps in the output image have the same affect as do the size of the areas or bumps in an image modified by a conventional watermarking program.

The applications for this technique include not only all image types, but also printed representations of all types (from security to commercial printing) independent of the medium. For example, instead of using a generic pattern in the background of a photo-ID document (i.e., a passport), the designer can elect to use a pattern that contains a watermark instead. In turn, this watermark may tie the photograph to this particular document.

Full sheets of paper could be pre-printed for use in security/ commercial printing applications. This paper could then be used for any number of applications, from people printing at home on paper that indicates to a copier that it shouldn't be copied, to commercial printers protecting their products from unwanted use.

Outside of just the print/image world these patterns could manifest themselves in other media, such as fabric, glass, plastics, paper, etc. Any media that can support variations in its make-up or construction could make use of this technique to carry a signal.

While the invention has been shown and described with respect to preferred embodiments thereof, it should be understood that various changes in form and detail can be made without departing from the spirit and scope of the invention.

APPENDIX A

Watermarking Methods, Apparatuses, and Applications (To provide a comprehensive disclosure without unduly lengthening the following specification, applicants incorporate by reference the cited patent documents.)

Watermarking is a quickly growing field of endeavor, with several different approaches. The present assignee's work is reflected in U.S. Pat. Nos. 5,710,834, 5,636,292, 5,721,788, allowed U.S. application Ser. Nos. 08/327,426, 08/598,083, 08/436,134 (to issue as U.S. Pat. No. 5,748,763), 08/436,102 (to issue as U.S. Pat. No. 5,748,783), and 08/614,521 (to issue as U.S. Pat. No. 5,745,604), and laid-open PCT application WO97/43736. Other work is illustrated by U.S. Pat. Nos. 5,734,752, 5,646,997, 5,659,726, 5,664,018, 5,671,277, 5,687,191, 5,687,236, 5,689,587, 5,568,570, 5,572,247, 5,574,962, 5,579,124, 5,581,500, 5,613,004, 5,629,770, 5,461,426, 5,743,631, 5,488,664, 5,530,759, 5,539,735, 4,943,973, 5,337,361, 5,404,160, 5,404,377, 5,315,098, 5,319,735, 5,337,362, 4,972,471, 5,161,210, 5,243,423, 5,091,966, 5,113,437, 4,939,515, 5,374,976, 4,855,827, 4,876,617, 4,939,515, 4,963,998, 4,969,041, and published foreign applications WO 98/02864, EP 822,550, WO 97/39410, WO 96/36163, GB 2,196,167, EP 777,197, EP 736,860, EP 705,025, EP 766,468, EP 782,322, WO 95/20291, WO 96/26494, WO 96/36935, WO 96/42151, WO 97/22206, WO 97/26733. Some of the foregoing patents relate to visible watermarking techniques. Other visible watermarking techniques (e.g. data glyphs) are described in U.S. Pat. Nos. 5,706,364, 5,689,620, 5,684,885, 5,680,223, 5,668,636, 5,640,647, 5,594,809.

Most of the work in watermarking, however, is not in the patent literature but rather in published research. In addition to the patentees of the foregoing patents, some of the other workers in this field (whose watermark-related writings can by found by an author search in the INSPEC database) include L Pitas, Eckhard Koch, Jian Zhao, Norishige Morimoto, Laurence Boney, Kineo Matsui, A. Z. Tirkel, Fred Mintzer, B. Macq, Ahmed H. Tewfik, Frederic Jordan, Naohisa Komatsu, and Lawrence O'Gorman.

The artisan is assumed to be familiar with the foregoing prior art.

In the following disclosure it should be understood that references to watermarking encompass not only the assignee's watermarking technology, but can likewise be practiced with any other watermarking technology, such as those indicated above.

Watermarking can be applied to myriad forms of information. These include imagery (including video) and audio— whether represented in digital form (e.g. an image comprised of pixels, digital video, etc.), or in an analog representation (e.g. non-sampled music, printed imagery, banknotes, etc.)

Watermarking can be applied to digital content (e.g. imagery, audio) either before or after compression. Watermarking can also be used in various "description" or "synthesis" language representations of content, such as Structured Audio, Csound, NetSound, SNHC Audio and the like (c.f. http://sound.media.mit.edu/mpeg4/) by specifying synthesis commands that generate watermark data as well as the intended audio signal. Watermarking can also be applied to ordinary media, whether or not it conveys information. Examples include paper, plastics, laminates, paper/film emulsions, etc. A watermark can embed a single bit of information, or any number of bits.

The physical manifestation of watermarked information most commonly takes the form of altered signal values, such as slightly changed pixel values, picture luminance, picture colors, DCT coefficients, instantaneous audio amplitudes, etc. However, a watermark can also be manifested in other ways, such as changes in the surface microtopology of a medium, localized chemical changes (e.g. in photographic emulsions), localized variations in optical density, localized changes in luminescence, etc. Watermarks can also be optically implemented in holograms and conventional paper watermarks.

One improvement to existing technology is to employ established web crawler services (e.g. AltaVista, Excite, or Inktomi) to search for watermarked content (on the Web, in internet news groups, BBS systems, on-line systems, etc.) in addition to their usual data collecting/indexing operations. Such crawlers can download files that may have embedded watermarks (e.g. *.JPG, *.WAV, etc.) for later analysis. These files can be processed, as described below, in real time. More commonly, such files are queued and processed by a computer distinct from the crawler computer. Instead of performing watermark-read operations on each such file, a screening technique can be employed to identify those most likely to be conveying watermark data. One such technique is to perform a DCT operation on an image, and look for spectral coefficients associated with certain watermarking techniques (e.g. coefficients associated with an inclined embedded subliminal grid). To decode spread-spectrum based watermarks, the analyzing computer requires access to the noise signal used to spread the data signal. In one embodiment, interested parties submit their noise/key signals to the crawler service so as to enable their marked content to be located. The crawler service maintains such information in confidence, and uses different noise signals in decoding an image (image is used herein as a convenient shorthand for imagery, video, and audio) until watermarked data is found (if present). This allows the use of web crawlers to locate content with privately-coded watermarks, instead of just publicly-coded watermarks as is presently the case. The queueing of content data for analysis provides certain opportunities for computational shortcuts. For example, like-sized images (e.g. 256×256 pixels) can be tiled into a larger image, and examined as a unit for the presence of watermark data. If the decoding technique (or the optional pre-screening technique) employs a DCT transform or the like, the block size of the transform can be tailored to correspond to the tile size (or some integral fraction thereof). Blocks indicated as likely having watermarks can then be subjected to a full read operation. If the queued data is sorted by file name, file size, or checksum, duplicate files can be identified. Once such duplicates are identified, the analysis computer need consider only one instance of the file. If watermark data is decoded from such a file, the content provider can be informed of each URL at which copies of the file were found.

Some commentators have observed that web crawler-based searches for watermarked images can be defeated by breaking a watermarked image into sub-blocks (tiles). HTML instructions, or the like, cause the sub-blocks to be presented in tiled fashion, recreating the complete image. However, due to the small size of the component sub-blocks, watermark reading is not reliably accomplished.

This attack is overcome by instructing the web-crawler to collect the display instructions (e.g. HTML) by which image files are positioned for display on a web page, in addition to the image files themselves. Before files collected from a web page are scrutinized for watermarks, they can be concatenated in the arrangement specified by the display instructions. By this arrangement, the tiles are reassembled, and the watermark data can be reliably recovered.

Another such postulated attack against web crawler detection of image watermarks is to scramble the image (and thus the watermark) in a file, and employ a Java applet or the like to unscramble the image prior to viewing. Existing web crawlers inspect the file as they find it, so the watermark is not detected. However, just as the Java descrambling applet can be invoked when a user wishes access to a file, the same applet can similarly be employed in a web crawler to overcome such attempted circumvention of watermark detection.

Although "content" can be located and indexed by various web crawlers, the contents of the "content" are unknown. A *.JPG file, for example, may include pornography, a photo of a sunset, etc.

Watermarks can be used to indelibly associate meta-data within content (as opposed to stored in a data structure that forms another part of the object, as is conventionally done with meta-data). The watermark can include text saying "sunset" or the like. More compact information representations can alternatively be employed (e.g. coded references). Still further, the watermark can include (or consist entirely of) a Unique ID (UID) that serves as an index (key) into a network-connected remote database containing the meta data descriptors. By such arrangements, web crawlers and the like can extract and index the meta-data descriptor tags, allowing searches to be conducted based on semantic descriptions of the file contents, rather than just by file name.

Existing watermarks commonly embed information serving to communicate copyright information. Some systems embed text identifying the copyright holder. Others embed a UID which is used as an index into a database where the name of the copyright owner, and associated information, is stored.

Looking ahead, watermarks should serve more than as silent copyright notices. One option is to use watermarks to embed "intelligence" in content. One form of intelligence is knowing its "home." "Home" can be the URL of a site with which the content is associated. A photograph of a car, for example, can be watermarked with data identifying the web site of an auto-dealer that published the image. Wherever the image goes, it serves as a link back to the original disseminator. The same technique can be applied to corporate logos. Wherever they are copied on the internet, a suitably-equipped browser or the like can decode the data and link back to the corporation's home page. (Decoding may be effected by positioning the cursor over the logo and pressing the right-mouse button, which opens a window of options—one of which is Decode Watermark.)

To reduce the data load of the watermark, the intelligence need not be wholly encoded in the content's watermark. Instead, the watermark can again provide a UID—this time identifying a remote database record where the URL of the car dealer, etc., can be retrieved. In this manner, images and the like become marketing agents—linking consumers with vendors (with some visual salesmanship thrown in). In contrast to the copyright paradigm, in which dissemination of imagery was an evil sought to be tracked and stopped, dissemination of the imagery can now be treated as a selling opportunity. A watermarked image becomes a portal to a commercial transaction.

(Using an intermediate database between a watermarked content file and its ultimate home (i.e. indirect linking) serves an important advantage: it allows the disseminator to change the "home" simply by updating a record in the database. Thus, for example, if one company is acquired by another, the former company's smart images can be made to point to the new company's home web page by updating a database record. In contrast, if the old company's home URL is hardcoded (i.e. watermarked) in the object, it may point to a URL that eventually is abandoned. In this sense, the intermediate database serves as a switchboard that couples the file to its current home.

The foregoing techniques are not limited to digital content files. The same approach is equally applicable with printed imagery, etc. A printed catalog, for example, can include a picture illustrating a jacket. Embedded in the picture is watermarked data. This data can be extracted by a simple handscanner/decoder device using straightforward scanning and decoding techniques (e.g. those known to artisans in those fields). In watermark-reading applications employing hand-scanners and the like, it is important that the watermark decoder be robust to rotation of the image, since the catalog photo will likely be scanned off-axis. One option is to encode subliminal graticules (e.g. visualization synchronization codes) in the catalog photo so that the set of image data can be post-processed to restore it to proper alignment prior to decoding.

The scanner/decoder device can be coupled to a modem-equipped computer, a telephone, or any other communications device. In the former instance, the device provides URL data to the computer's web browser, linking the browser to the catalog vendor's order page. (The device need not include its own watermark decoder; this task can be performed by the computer.) The vendor's order page can detail the size and color options of the jacket, inventory availability, and solicit ordering instructions (credit card number, delivery options, etc.)—as is conventionally done with on-line merchants. Such a device connected to a telephone can dial the catalog vendor's toll-free automated order-taking telephone number (known, e.g., from data encoded in the watermark), and identify the jacket to the order center. Voice prompts can then solicit the customer's choice of size, color, and delivery options, which are input by Touch Tone instructions, or by voiced words (using known voice recognition software at the vendor facility).

In such applications, the watermark may be conceptualized as an invisible bar code employed in a purchase transaction. Here, as elsewhere, the watermark can serve as a seamless interface bridging the print and digital worlds Another way of providing content with intelligence is to use the watermark to provide Java or ActiveX code. The code can be embedded in the content, or can be stored remotely and linked to the content. When the watermarked object is activated, the code can be executed (either automatically, or at the option of the user). This code can perform virtually any function. One is to "phone home"—initiating a browser and linking to the object's home The object can then relay any manner of data to its home. This data can specify some attribute of the data, or its use. The code can also prevent accessing the underlying content until permission is received. An example is a digital movie that, when double-clicked, automatically executes a watermark-embedded Java applet which links through a browser to the movie's distributor. The user is then prompted to input a credit card number. After the number has been verified and a charge made, the applet releases the content of the file to the computer's viewer for viewing of the movie. Support for these operations is desirably provided via the computer's operating system, or plug-in software.

Such arrangements can also be used to collect user-provided demographic information when smart image content is accessed by the consumer of the content. The demographic information can be written to a remote database and can be used for market research, customization of information about the content provided to the consumer, sales opportunities, advertising, etc.

In audio and video and the like, watermarks can serve to convey related information, such as links to WWW fan sites, actor biographies, advertising for marketing tie-ins (T-shirts, CDs, concert tickets). In such applications, it is desirable (but not necessary) to display on the user interface (e.g. screen) a small logo to signal the presence of additional information. When the consumer selects the logo via some selection device (mouse, remote control button, etc.), the information is revealed to the consumer, who can then interact with it.

Much has been written (and patented) on the topic of asset rights management. Sample patent documents include U.S. Pat. Nos. 5,715,403, 5,638,443, 5,634,012, 5,629,980. Again, much of the technical work is memorialized in journal articles, which can be identified by searching for relevant company names and trademarks such as IBM's Cryptolope system, Portland Software's ZipLock system, the Rights Exchange service by Softbank Net Solutions, and the DigiBox system from InterTrust Technologies.

An exemplary asset management system makes content available (e.g. from a web server, or on a new computer's hard disk) in encrypted form. Associated with the encrypted content is data identifying the content (e.g. a preview) and data specifying various rights associated with the content. If a user wants to make fuller use of the content, the user provides a charge authorization (e.g. a credit card) to the distributor, who then provides a decryption key, allowing access to the content. (Such systems are often realized using object-based technology. In such systems, the content is commonly said to be distributed in a "secure container.")

Desirably, the content should be marked (personalized/serialized) so that any illicit use of the content (after decryption) can be tracked. This marking can be performed with watermarking, which assures that the mark travels with the content wherever—and in whatever form—it may go. The watermarking can be effected by the distributor—prior to dissemination of the encrypted object—such as by encoding a UID that is associated in a database with that particular container. When access rights are granted to that container, the database record can be updated to reflect the purchaser, the purchase date, the rights granted, etc. An alternative is to include a watermark encoder in the software tool used to access (e.g. decrypt) the content. Such an encoder can embed watermark data in the content as it is released from the secure container, before it is provided to the user. The embedded data can include a UID, as described above. This UID can be assigned by the distributor prior to disseminating the container. Alternatively, the UID can be a data string not known or created until access rights have been granted. In addition to the UID, the watermark can include other data not known to the distributor, e.g. information specific to the time(s) and manner(s) of accessing the content.

In other systems, access rights systems can be realized with watermarks without containers etc. Full resolution images, for example, can be freely available on the web. If a user wishes to incorporate the imagery into a web page or a magazine, the user can interrogate the imagery as to its terms and conditions of use. This may entail linking to a web site specified by the embedded watermark (directly, or through an intermediate database), which specifies the desired information. The user can then arrange the necessary payment, and use the image knowing that the necessary rights have been secured.

As noted, digital watermarks can also be realized using conventional (e.g. paper) watermarking technologies. Known techniques for watermarking media (e.g. paper, plastic, polymer) are disclosed in U.S. Pat. Nos. 5,536,468, 5,275,870, 4,760,239, 4,256,652, 4,370,200, and 3,985,927 and can be adapted to display of a visual watermark instead of a logo or the like. Note that some forms of traditional watermarks which are designed to be viewed with transmissive light can also show up as low level signals in reflective light, as is typically used in scanners. Transmissive illumination detection systems can also be employed to detect such watermarks, using optoelectronic traditional-watermark detection technologies known in the art.

As also noted, digital watermarks can be realized as part of optical holograms. Known techniques for producing and securely mounting holograms are disclosed in U.S. Pat. Nos. 5,319,475, 5,694,229, 5,492,370, 5,483,363, 5,658,411 and 5,310,222. To watermark a hologram, the watermark can be represented in the image or data model from which the holographic diffraction grating is produced. In one embodiment, the hologram is produced as before, and displays an object or symbol. The watermark markings appear in the background of the image so that they can be detected from all viewing angles. In this context, it is not critical that the watermark representation be essentially imperceptible to the viewer. If desired, a fairly visible noise-like pattern can be used without impairing the use to which the hologram is put.

Digital watermarks can also be employed in conjunction with labels and tags. In addition to conventional label/tag printing processes, other techniques—tailored to security—can also be employed. Known techniques useful in producing security labels/tags are disclosed in U.S. Pat. Nos. 5,665,194, 5,732,979, 5,651,615, and 4,268,983. The imperceptibility of watermarked data, and the ease of machine decoding, are some of the benefits associated with watermarked tags/labels. Additionally, the cost is far less than many related technologies (e.g. holograms). Watermarks in this application can be used to authenticate the originality of a product label, either to the merchant or to the consumer of the associated product, using a simple scanner device, thereby reducing the rate of counterfeit product sales.

Recent advances in color printing technology have greatly increased the level of casual counterfeiting. High quality scanners are now readily available to many computer users, with 300 dpi scanners available for under $100, and 600 dpi scanners available for marginally more. Similarly, photographic quality color ink jet printers are commonly available from Hewlett-Packard Co., Epson, etc. for under $300.

Watermarks in banknotes and other security documents (passports, stock certificates, checks, etc.—all collectively referred to as banknotes herein) offer great promise to reduce such counterfeiting, as discussed more fully below. Additionally, watermarks provide a high-confidence technique for banknote authentication. One product enabled by this increased confidence is automatic teller machines that accept, as well as dispense, cash. The machine is provided with known optical scanning technology to produce digital data corresponding to the face(s) of the bill. This image set is then analyzed to extract the watermark data. In watermarking technologies that require knowledge of a code signal for decoding (e.g. noise modulation signal, crypto key, spreading signal, etc.), a bill may be watermarked in accordance with several such codes. Some of these codes are public—permitting their reading by conventional machines. Others are private, and are reserved for use by government agencies and the like. (C.f. public and private codes in the present assignee's issued patents.)

Banknotes presently include certain markings which can be used as an aid in note authentication. Well known visible structures are added to banknotes to facilitate visual authentication and machine detection. An example is the seal of the issuing bank. Others are geometrical markings. Desirably, a note is examined by an integrated detection system, for both such visible structures as well as the present watermark-embedded data, to determine authenticity.

The visible structures can be sensed using known pattern recognition techniques. Examples of such techniques are disclosed in U.S. Pat. Nos. 5,321,773, 5,390,259, 5,533,144, 5,539,841, 5,583,614, 5,633,952, 4,723,149 and 5,424,807 and laid-open foreign application EP 766,449. The embedded watermark data can be recovered using the scanning/analysis techniques disclosed in the cited patents and publications.

To reduce counterfeiting, it is desirable that document-reproducing technologies recognize banknotes and refuse to reproduce same. A photocopier, for example, can sense the presence of either a visible structure *or* embedded banknote watermark data, and disable copying if either is present. Scanners and printers can be equipped with a similar capability—analyzing the data scanned or to be printed for either of these banknote hallmarks. If either is detected, the software (or hardware) disables further operation.

The watermark detection criteria provides an important advantage not otherwise available. An original bill can be doctored (e.g. by white-out, scissors, or less crude techniques) to remove/obliterate the visible structures. Such a document can then be freely copied on either a visible structure-sensing photocopier or scanner/printer installation. The removed visible structure can then be added in via a second printing/photocopying operation. If the printer is not equipped with banknote-disabling capabilities, image-editing tools can be used to insert visible structures back into image data sets scanned from such doctored bills, and the complete bill freely printed. By additionally including embedded watermark data in the banknote, and sensing same, such ruses will not succeed.

(A similar ruse is to scan a banknote image on a non-banknote-sensing scanner. The resulting image set can then be edited by conventional image editing tools to remove/obliterate the visible structures. Such a data set can then be printed—even on a printer/photocopier that examines such data for the presence of visible structures. Again, the missing visible structures can be inserted by a subsequent printing/photocopying operation.)

Desirably, the visible structure detector and the watermark detector are integrated together as a single hardware and/or software tool. This arrangement provides various economies, e.g., in interfacing with the scanner, manipulating pixel data sets for pattern recognition and watermark extraction, electronically re-registering the image to facilitate pattern recognition/watermark extraction, issuing control signals (e.g. disabling) signals to the photocopier/scanner, etc.

A related principle is to insert an imperceptible watermark having a UID into all documents printed with a printer, scanned with a scanner, or reproduced by a photocopier. The UID is associated with the particular printer/photocopier/scanner in a registry database maintained by the products' manufacturers. The manufacturer can also enter in this database the name of the distributor to whom the product was initially shipped. Still further, the owner's name and address can be added to the database when the machine is registered for warranty service. While not preventing use of such machines in counterfeiting, the embedded UID facilitates identifying the machine that generated a counterfeit banknote. (This is an application in which a private watermark might best be used.)

While the foregoing applications disabled potential counterfeiting operations upon the detection of *either* a visible structure or watermarked data, in other applications, both criteria must be met before a banknote is recognized as genuine. Such applications typically involve the receipt or acceptance of banknotes, e.g. by ATMs as discussed above.

The foregoing principles (employing just watermark data, or in conjunction with visible indicia) can likewise be used to prevent counterfeiting of tags and labels (e.g. the fake labels and tags commonly used in pirating Levis brand jeans, Microsoft software, etc.)

The reader may first assume that banknote watermarking is effected by slight alterations to the ink color/density/distribution, etc. on the paper. This is one approach. Another is to watermark the underlying medium (whether paper, polymer, etc.) with a watermark. This can be done by changing the microtopology of the medium (a la mini-Braille) to manifest the watermark data. Another option is to employ a laminate on or within the banknote, where the laminate has the watermarking manifested thereon/therein. The laminate can be textured (as above), or its optical transmissivity can vary in accordance with a noise-like pattern that is the watermark, or a chemical property can similarly vary.

Another option is to print at least part of a watermark using photoluminescent ink. This allows, e.g., a merchant presented with a banknote, to quickly verify the presence of *some* watermark-like indicia in/on the bill even without resort to a scanner and computer analysis (e.g. by examining under a black light). Such photoluminescent ink can also print human-readable indicia on the bill, such as the denomination of a banknote. (Since ink-jet printers and other common mass-printing technologies employ cyan/magenta/yellow/black to form colors, they can produce only a limited spectrum of colors. Photoluminescent colors are outside their capabilities. Fluorescent colors—such as the yellow, pink and green dyes used in highlighting markers—can similarly be used and have the advantage of being visible without a black light.)

An improvement to existing encoding techniques is to add an iterative assessment of the robustness of the mark, with a corresponding adjustment in a re-watermarking operation. Especially when encoding multiple bit watermarks, the characteristics of the underlying content may result in some bits being more robustly (e.g. strongly) encoded than others. In an illustrative technique employing this improvement, a watermark is first embedded in an object. Next, a trial decoding operation is performed. A confidence measure (e.g. signal-to-noise ratio) associated with each bit detected in the decoding operation is then assessed. The bits that appear weakly encoded are identified, and corresponding changes are made to the watermarking parameters to bring up the relative strengths of these bits. The object is then watermarked anew, with the changed parameters. This process can be repeated, as needed, until all of the bits comprising the encoded data are approximately equally detectable from the encoded object, or meet some predetermined signal-to-noise ratio threshold.

The foregoing applications, and others, can generally benefit by multiple watermarks. For example, an object (physical or data) can be marked once in the spatial domain, and a second time in the spatial frequency domain. (It should be understood that any change in one domain has repercussions in the other. Here we reference the domain in which the change is directly effected.)

Another option is to mark an object with watermarks of two different levels of robustness, or strength. The more robust watermark withstands various types of corruption, and is detectable in the object even after multiple generations of intervening distortion. The less robust watermark can be made frail enough to fail with the first distortion of the object. In a banknote, for example, the less robust watermark serves as an authentication mark. Any scanning and reprinting operation will cause it to become unreadable. Both the robust and the frail watermarks should be present in an authentic banknote; only the former watermark will be present in a counterfeit.

Still another form of multiple-watermarking is with content that is compressed. The content can be watermarked once (or more) in an uncompressed state. Then, after compression, a further watermark (or watermarks) can be applied.

Still another advantage from multiple watermarks is protection against sleuthing. If one of the watermarks is found and cracked, the other watermark(s) will still be present and serve to identify the object.

The foregoing discussion has addressed various technological fixes to many different problems. Exemplary solutions have been detailed above. Others will be apparent to the artisan by applying common knowledge to extrapolate from the solutions provided above.

For example, the technology and solutions disclosed herein have made use of elements and techniques known from the cited references. Other elements and techniques from the cited references can similarly be combined to yield further implementations within the scope of the present invention. Thus, for example, holograms with watermark data can be employed in banknotes, single-bit watermarking can commonly be substituted for multi-bit watermarking, technology described as using imperceptible watermarks can alternatively be practiced using visible watermarks (glyphs, etc.), techniques described as applied to images can likewise be applied to video and audio, local scaling of watermark energy can be provided to enhance watermark signal-to-noise ratio without increasing human perceptibility, various filtering operations can be employed to serve the functions explained in the prior art, watermarks can include subliminal graticules to aid in image re-registration, encoding may proceed at the granularity of a single pixel (or DCT coefficient), or may similarly treat adjoining groups of pixels (or DCT coefficients), the encoding can be optimized to withstand expected forms of content corruption. Etc., etc., etc. Thus, the exemplary embodiments are only selected samples of the solutions available by combining the teachings referenced above. The other solutions necessarily are not exhaustively described herein, but are fairly within the understanding of an artisan given the foregoing disclosure and familiarity with the cited art.

The invention claimed is:

1. A printed security document, the security document comprising artwork including a security pattern, characterized in that the security pattern has the form of a line structure in which line width and/or line spacing is adjusted to carry predefined data, the artwork is generated by the modifying at least one color of at least a part of the artwork to embed the security pattern in the artwork.

2. The printed security document of claim 1 wherein the security pattern is repeated in blocks across the security document.

3. The printed security document of claim 1 wherein the security pattern includes a pattern in a frequency transform domain that enables reading of the predefined data despite rotation of the security document.

4. The printed security document of claim 1 wherein the security pattern includes a pattern in a frequency transform domain that enables reading of the predefined data despite spatial scaling of the security document.

5. The printed security document of claim 1 wherein the predefined data conveys a device control signal to control reproduction of the printed security document.

6. An article of currency according to claim 1.

7. A method of generating artwork for a security document, the method comprising:
provproviding a security pattern modulated to carry predefined data; and
modifying width or line spacing of the artwork of the security document according to the security pattern, wherein the artwork is generated by the modifying at least one color of at least a part of the artwork to embed the security pattern in the artwork.

8. The method of claim 7 wherein the security pattern includes a pattern in a frequency transform domain that enables detection of the predefined data despite rotation of the security document.

9. The method of claim 7 wherein the security pattern includes a pattern in a frequency transform domain that enables detection of the predefined data despite spatial scaling of the security document.

10. The method of claim 7 wherein the security pattern is repeated in blocks across the artwork.

11. The method of claim 7 wherein the predefined data signals a device to control reproduction of an image of the security document.

12. The method of claim 7 including:
performing an inverse transform of a frequency domain pattern to produce at least a portion of the security pattern.

13. The method of claim 12 wherein the frequency domain pattern enables detection of the predefined data despite rotation of the security document.

14. A printed document, the document comprising artwork including a security pattern, characterized in that the security pattern has the form of a contour structure in which contours are provided in a manner that modulates at least one color of the artwork to carry predefined data, the artwork is generated by the modifying at least one color of at least a part of the artwork to embed the security pattern in the artwork.

15. In a system that processes visible light scan data acquired from a printed line art document, an improved method of operation including:
utilizing a processor or electronic processing circuitry, analyzing said scan data to detect a control signal steganographically represented by variations in width or placement of lines comprising the line art; and
taking an action in response to detection of the control signal.

16. In a system that processes visible light electronic scan data acquired from a printed line art document, an improved method of operation including:
analyzing said electronic scan data to detect a control signal steganographically represented by variations in width or placement of lines comprising the line art, wherein the analyzing includes transforming the scan data to a complementary signal domain, and detecting a pattern in the transformed data; and
taking an action in response to detection of the control signal.

17. The method of claim 16 in which said transforming generates transform data based on a Fourier transform.

18. A printed currency document, the printed currency document comprising a pattern, the pattern representing or defining a predefined signal, the presence of the predefined signal is not apparent to a human observer of the printed currency document, the predefined signal being determined from the printed currency document by obtaining image data utilizing visible light imaging, the image data corresponding to at least a portion of the printed currency document, transforming the image data to a complementary signal domain to yield transform data, the transforming generates the transform data based on a Fourier transform, and analyzing the transform data to determine the predefined signal.

19. In a system that processes visible light image data corresponding to a printed currency document, a method comprising:
obtaining visible light image data corresponding to at least a portion of a printed currency document;
analyzing using a printer or electronic processor the visible light image data to detect: i) a plural-bit signal steganographically hidden in the printed currency document through alterations to artwork or a graphic carried by the printed currency document; or ii) a predefined signal represented or defined by a pattern carried by the printed currency document, the predefined signal being determined from transforming the visible light image data to a complementary signal domain to yield transform data and analyzing the transform data to determine the predefined signal; and
taking an action in response to detection of the: i) plural-bit signal; or ii) the predefined signal.

20. The method of claim 19 wherein said act of analyzing comprises analyzing the image data to detect both the plural-bit signal and the predefined signal.

21. The method of claim 20 wherein said act of taking an action is only responsive upon detection of both the plural-bit signal and the predefined signal.

22. The method of claim 19 wherein the presence of the predefined signal is not apparent to a human observer of the printed currency document.

23. A computer readable medium comprising instructions stored thereon or circuitry to perform the method of claim 19.

24. A printed currency document comprising: i) a plural-bit signal steganographically hidden with alterations to artwork or a graphic carried by the printed currency document, the plural-bit signal being obtained through analysis of visible light image data corresponding to the artwork or graphic; and ii) a pattern carried by the printed currency document, the pattern representing or defining a predefined signal, the predefined signal being determined from transforming the visible light image data to a complementary signal domain to yield transform data and analyzing the transform data to determine the predefined signal.

25. The printed currency document of claim 24 wherein the presence of the predefined signal is not apparent to a human observer of the printed currency document.

* * * * *